United States Patent
Kolluru et al.

(10) Patent No.: US 9,959,368 B2
(45) Date of Patent: May 1, 2018

(54) COMPUTER GENERATED EMULATION OF A SUBJECT

(71) Applicant: Kabushiki Kaisha Toshiba, Minato-ku (JP)

(72) Inventors: Balakrishna Venkata Jagannadha Kolluru, Cambridge (GB); Vincent Ping Leung Wan, Cambridge (GB); Bjorn Dietmar Rafael Stenger, Cambridge (GB); Roberto Cipolla, Cambridge (GB); Javier Latorre-Martinez, Cambridge (GB); Langzhou Chen, Cambridge (GB); Ranniery Da Silva Maia, Cambridge (GB); Kayoko Yanagisawa, Cambridge (GB); Norbert Braunschweiler, Cambridge (GB); Ioannis Stylianou, Cambridge (GB); Robert Arthur Blokland, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 621 days.

(21) Appl. No.: 14/458,556

(22) Filed: Aug. 13, 2014

(65) Prior Publication Data
US 2015/0052084 A1 Feb. 19, 2015

(30) Foreign Application Priority Data
Aug. 16, 2013 (GB) .................................. 1314711.1

(51) Int. Cl.
*G06F 17/30* (2006.01)
*G06N 3/00* (2006.01)
(Continued)

(52) U.S. Cl.
CPC ....... *G06F 17/30979* (2013.01); *G06N 3/006* (2013.01); *G06T 13/40* (2013.01);
(Continued)

(58) Field of Classification Search
None
See application file for complete search history.

(56) References Cited

U.S. PATENT DOCUMENTS 5,983,190 A 11/1999 Trower, II et al.
5,987,415 A 11/1999 Breese et al.
(Continued)

FOREIGN PATENT DOCUMENTS

EP          0 543 329 B1    2/2002
WO    WO 2007/098560 A1    9/2007
WO    WO 2008/134625 A1   11/2008

OTHER PUBLICATIONS

U.S. Appl. No. 13/799,962, filed Mar. 13, 2013, 2013/0262109 A1, Javier Latorre-Martinez et al.
(Continued)

*Primary Examiner* — Alan Chen
(74) *Attorney, Agent, or Firm* — Oblon, McClelland, Maier & Neustadt, L.L.P.

(57) ABSTRACT

A system for emulating a subject, to allow a user to interact with a computer generated talking head with the subject's face and voice;
said system comprising a processor, a user interface and a personality storage section,
the user interface being configured to emulate the subject, by displaying a talking head which comprises the subject's face and output speech from the mouth of the face with the subject's voice, the user interface further comprising a receiver for receiving a query from the
(Continued)

user, the emulated subject being configured to respond to the query received from the user, the processor comprising a dialogue section and a talking head generation section, wherein said dialogue section is configured to generate a response to a query inputted by a user from the user interface and generate a response to be outputted by the talking head, the response being generated by retrieving information from said personality storage section, said personality storage section comprising content created by or about the subject, and said talking head generation section is configured to:

convert said response into a sequence of acoustic units, the talking head generation section further comprising a statistical model, said statistical model comprising a plurality of model parameters, said model parameters being derived from said personality storage section, the model parameters describing probability distributions which relate an acoustic unit to an image vector and speech vector, said image vector comprising a plurality of parameters which define the subject's face and said speech vector comprising a plurality of parameters which define the subject's voice, the talking head generation section being further configured to output a sequence of speech vectors and image vectors which are synchronised such that the head appears to talk.

3 Claims, 17 Drawing Sheets

(51) Int. Cl.
| | |
|---|---|
| *G06T 13/40* | (2011.01) |
| *G10L 13/027* | (2013.01) |
| *G10L 13/08* | (2013.01) |
| *G06N 99/00* | (2010.01) |

(52) U.S. Cl.
CPC .......... *G06N 99/005* (2013.01); *G10L 13/027* (2013.01); *G10L 13/086* (2013.01)

(56) References Cited

U.S. PATENT DOCUMENTS

| | | | | |
|---|---|---|---|---|
| 5,991,755 | A * | 11/1999 | Noguchi | G06F 17/30675 |
| 6,766,316 | B2 * | 7/2004 | Caudill | G06F 17/3069 |
| 7,617,176 | B2 * | 11/2009 | Zeng | G06F 17/3071 |
| 7,747,611 | B1 * | 6/2010 | Milic-Frayling | G06F 17/30867 |
| | | | | 707/722 |
| 8,249,879 | B2 | 8/2012 | Bangalore et al. | |
| 8,275,803 | B2 | 9/2012 | Brown et al. | |
| 8,954,425 | B2 * | 2/2015 | Xiao | G06F 17/30241 |
| | | | | 707/724 |
| 2004/0117189 | A1 * | 6/2004 | Bennett | G06F 17/27 |
| | | | | 704/270.1 |
| 2006/0156222 | A1 * | 7/2006 | Chi | G06F 17/241 |
| | | | | 715/231 |
| 2006/0204945 | A1 | 9/2006 | Masuichi et al. | |
| 2008/0269958 | A1 * | 10/2008 | Filev | B60W 50/10 |
| | | | | 701/1 |
| 2009/0055190 | A1 | 2/2009 | Filev et al. | |
| 2009/0055824 | A1 | 2/2009 | Rychtyckyj et al. | |
| 2009/0063154 | A1 | 3/2009 | Gusikhin et al. | |
| 2009/0064155 | A1 | 3/2009 | Giuli et al. | |
| 2010/0085363 | A1 | 4/2010 | Smith et al. | |
| 2011/0250575 | A1 * | 10/2011 | Kalvachev | G06Q 30/02 |
| | | | | 434/236 |
| 2012/0280974 | A1 * | 11/2012 | Wang | G06T 13/40 |
| | | | | 345/419 |
| 2012/0290509 | A1 | 11/2012 | Heck et al. | |
| 2013/0262109 | A1 | 10/2013 | Latorre-Martinez et al. | |
| 2013/0262119 | A1 | 10/2013 | Latorre-Martinez et al. | |
| 2013/0290905 | A1 * | 10/2013 | LuVogt | G06N 3/006 |
| | | | | 715/835 |
| 2014/0032220 | A1 * | 1/2014 | Lerner | G10L 17/24 |
| | | | | 704/273 |
| 2014/0289323 | A1 * | 9/2014 | Kutaragi | G06Q 50/01 |
| | | | | 709/203 |
| 2014/0313208 | A1 | 10/2014 | Filev et al. | |

OTHER PUBLICATIONS

U.S. Appl. No. 13/836,146, filed Mar. 15, 2013, 2013/0262119 A1, Javier Latorre-Martinez et al.

U.S. Appl. No. 14/455,573, filed Aug. 8, 2014, Javier Latorre-Martinez et al.

United Kingdom Search Report dated Feb. 20, 2014 in GB 1314711. 1, filed on Aug. 16, 2013 ( with written opinion).

Robert Anderson et al. "Expressive Visual Text-To-Speech Using Active Appearance Models", IEEE Conference on Computer Vision and Pattern Recognition, 2013, 9 pages.

Javier Latorre et al. "Speech factorization for HMM-TTS based on cluster adaptive training", ISCA Archive INTERSPEECH, 2012, 4 pages.

European Search Report dated Feb. 10, 2015 in Patent Application No. 14181166.1.

A. Tanju Erdem, et al., "Advanced Authoring Tools for Game-Based Training" Momentum Digital Media Technologies, XP05B009371, Jul. 13, 2009, 8 Pages.

* cited by examiner

COMPUTER GENERATED EMULATION OF A SUBJECT

CROSS-REFERENCE TO RELATED APPLICATION

This application is based upon and claims the benefit of priority from United Kingdom Patent Application No. 1314711.1, filed on Aug. 16, 2013, the entire contents of which are incorporated herein by reference.

FIELD

Embodiments described herein relate generally to a computer emulation of a subject.

BACKGROUND

The ability to be able to emulate a subject such that a subject's voice, face and dialogue intelligence are emulated, has a wide variety of uses such a providing a human-like interface to a query system through to providing a personalised avatar which can represent the subject.

BRIEF DESCRIPTION OF THE DRAWINGS

Systems and methods in accordance with non-limiting embodiments will now be described with reference to the accompanying figures in which.

DETAILED DESCRIPTION

Figure 1:
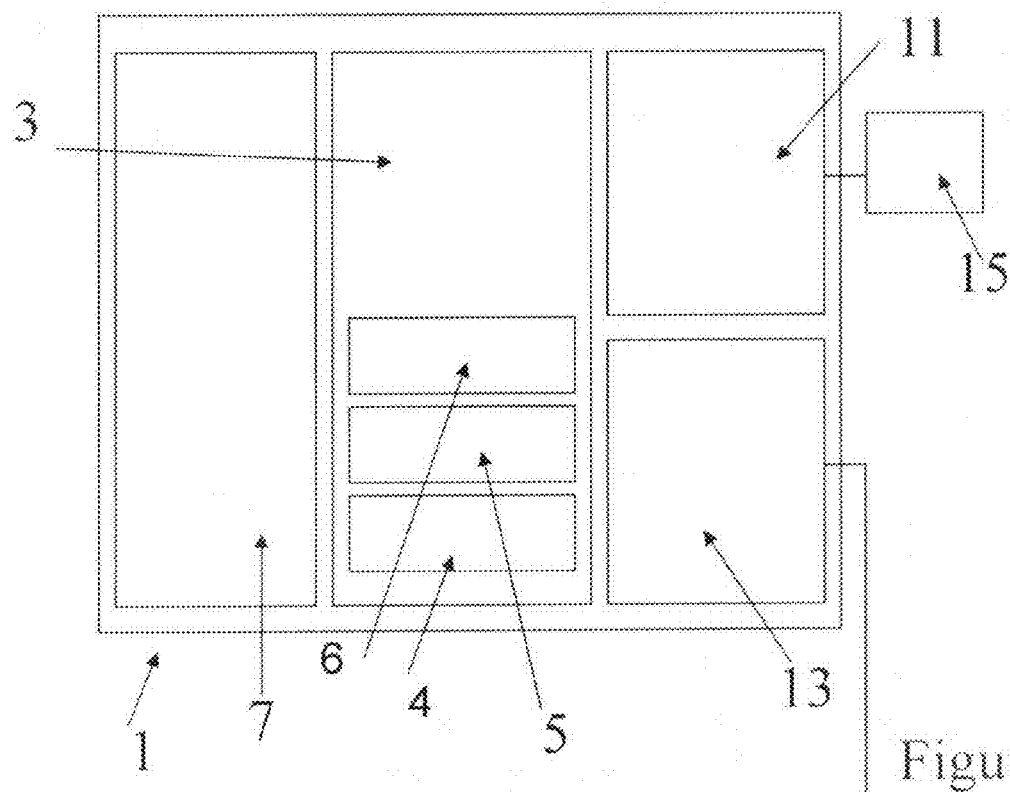
FIG. 1 is a schematic of a system for computer generating a head, which can be used to represent an emulated subject.
Figure 1:
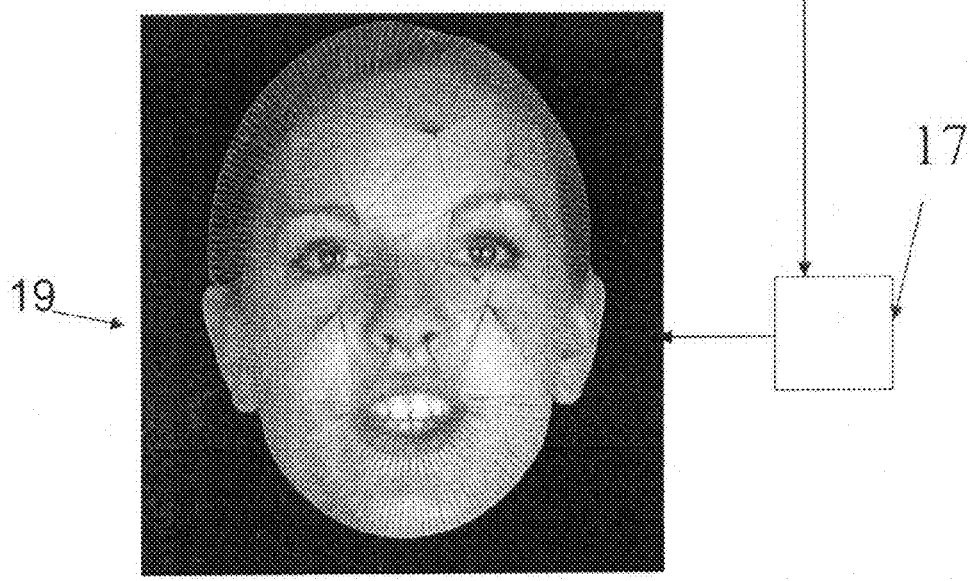

In an embodiment, a system for emulating a subject is provided. The system allows a user to interact with a computer generated talking head with the subject's face and voice;

said system comprising a processor, a user interface and a personality storage section, the user interface being configured to emulate the subject, by displaying a talking head which comprises the subject's face and output speech from the mouth of the face with the subject's voice, the user interface further comprising a receiver for receiving a query from the user, the emulated subject being configured to respond to the query received from the user, the processor comprising a dialogue section or system and a talking head generation section, wherein said dialogue section is configured to generate a response to a query inputted by a user from the user interface and generate a response to be outputted by the talking head, the response being generated by retrieving information from said personality storage section, said personality storage section comprising content created by or about the subject, and said talking head generation section is configured to:

convert said response into a sequence of acoustic units, the talking head generation section further comprising a statistical model, said statistical model comprising a plurality of model parameters, said model parameters being derived from said personality storage section, the model parameters describing probability distributions which relate an acoustic unit to an image vector and speech vector, said image vector comprising a plurality of parameters which define the subject's face and said speech vector comprising a plurality of parameters which define the subject's voice, the talking head generation section being further configured to output a sequence of speech vectors and image vectors which are synchronised such that the head appears to talk.

In a further embodiment, the head outputs an expressive response such that said face and voice demonstrate expression, said processor further comprising an expression deriving section configured to determine the expression with which to output the generated response, and wherein the said model parameters describe probability distributions which relate an acoustic unit to an image vector and speech vector for an associated expression.

Systems in accordance with the above embodiments, allow the capture of a subject's personality. In an embodiment, the personality is captured by defining a personality as a combination of speech, face, expression and dialogue intelligence. In systems in accordance with embodiments of the present invention, the speech and face of a subject can be parameterised. In further embodiments, the expression which a subject displays both facially and vocally can also be parameterised. By capturing this information it is possible to generate a personality file with the speech and face of the subject and even the facial and vocal expressions which they specifically use when talking. By establishing a database of information concerning the subject it is possible to construct dialogue intelligence which is also to be added to the personality file. Thus the subject can be emulated since a talking head is provided with the subject's face and speech, the head outputs the answers based on information provided by or about the subject.

Thus, the subject can interact with other people via the synthetic audiovisual face and voice
 a synthetic speech, sounding like the subject themselves
 a synthetic face looking like the subject themselves and talking in synchronization with the generated speech.

In an embodiment, the user will also provide the system with various locations for information about them such as, they TWITTER feed, FACEBOOK posts, access to certain e-mails, access to posts made on particular websites etc. The system may be provided with details of where to seek factual information about the user such as from company websites, FACEBOOK page, LINKEDIN profile etc.

The system can be used for a number of different applications, for example:
 Automated tourist-guide application. Most tourist information is available either as a book or a pdf; whilst there are a few VIP-rendered audio guides, our system can handle such prepared information with ease while being able to answer any questions one may have during their stay
 A Personality banking tool for users to create digital replica of themselves that can act on their behalf when the user is absent (as in one banks their personality for future use)
 A memoir for the user's progeny to interact with people in distant future
 A human versioning tool: imagine a user talking to a version of themselves who is 20 years younger
 An acting tutor
 A customizable, bespoke interactive avatar for a company; this avatar can answer questions relating to various products, their advantages and related aspects. Using synthetic audiovisual bespoke reading with (or without) expression CAT as the basis for an interactive face, along with dialog intelligence derived from product information, it will make a viable product
 A dialogue training system for people with communication impairment (autism, deafness etc.)
 A Tutor for social interactions (interviewing, flirting, customer interaction, etc.) Dialogue trainer for foreign language learning
 Virtual friends/partners/long distance relationships
 Interactive dialogue with celebrity's avatar
 Virtual face for robots/home robotics
 Entertainment productions: TV/Internet shows with single character or multiple characters interacting The nature of the information captured for training the dialogue intelligence will depend on the application for the system.

The manually captured personality can be captured in a file such as an XML file.

In further embodiments, the face and/or voice may be expressive.

The dialogue intelligence may be derived from a number of sources, for example posts collected from social media websites, e-mails and other content from or about the subject. The dialogue section/system may be configured to navigate a set of rules stored in said personality storage section to generate the response. In another embodiment, the dialogue system is configured to retrieve a response from said personality storage section by searching information which has been stored in the said personality storage section in an unstructured form.

The dialogue system may be configured to search said information stored in an unstructured form using a word-vector or n-gram search model. In further embodiment, a rule based approach and a free form search may be combined, for example where the dialogue system is configured to understand said query and based on said understanding select to generate said response using a set of rules stored in said personality storage section or by searching information stored in a non-hierarchical form. The dialogue system may search the rule based answers and then search the non-hierarchical form data if no suitable response is found in the rule based data.

Expression can be built into the system in a number of different ways. In one embodiment, the model parameter in each probability distribution in said associated expression is expressed as a weighted sum of parameters of the same type, and wherein the weighting used is expression dependent, such that converting said sequence of acoustic units to a sequence of image vectors comprises retrieving the expression dependent weights for said selected expression.

In a further embodiment, the parameters are provided in clusters and each cluster comprises at least one sub-cluster, wherein said expression dependent weights are retrieved for each cluster such that there is one weight per sub-cluster.

The above has described a system where the output is generated using a talking head. However, other forms of output may be possible.

In a further embodiment, a system is provided for creating a response to an inputted user query, said system comprising:
 a personality file section, said personality file section comprising a plurality of documents stored in an unstructured form;
 a query conversion section configured to convert said query into a word vector;
 a first comparison section configured to compare said word vector generated from said query with word vectors generated from the documents in said personality file section and output identified documents;
 a second comparison section configured to compare said word vector selected from said query and passages from said identified documents and to rank said selected passages, said ranking being based on the number of matches between said selected passage and said query; and
 a concatenation section adapted to concatenate selected passages together using sentence connectors, wherein said sentence connectors are chosen from a plurality of sentence connectors, said sentence connectors being chosen on the basis of a statistical model.

The documents may be any of the above described text sources such as TWITTER feeds, e-mails etc.

The above system may be combined with the talking head generation as described above or it may simply be used to output a text response.

The ranking of the selected passages is based on a normalised measure of the number of matches between said selected passage and said query. The sentence connectors may be chosen using a language model. In a further embodiment, the system is configured to set a predetermined size for the response. For example, the system may be configured to select a response having a length of approximately 15 words or a further set value.

In a further embodiment the system is configured to output an expressive response such that said face and voice demonstrate expression, said processor further comprising an expression deriving section configured to determine the expression with which to output the generated response, and wherein the said model parameters describe probability distributions which relate an acoustic unit to an image vector and speech vector for an associated expression.

In a further embodiment, a system for generating a personality file is provided, said personality file being used to store information relating to the speech, face and dialogue intelligence of a subject such that the subject can be emulated, said personality file being stored in said personality storage section, the system for generating a personality file comprising:
an interface for inputting information identifying content created by or about the subject;
an audio-visual recording system configured to record the voice and face of a subject, when reading known text, while using a range of different emotions;
and a processor being configured to:
curate said information identifying content created by or about said user, said curation comprising organising said content into documents and building an n-gram language model for said documents and also a word vector model for each document; and
produce a statistical model, said statistical model comprising a plurality of model parameters describing probability distributions which relate an acoustic unit to an image vector and speech vector, said image vector comprising a plurality of parameters which define the subject's face and said speech vector comprising a plurality of parameters which define the subject's voice,
the processor being configured to train said statistical model such that a sequence of speech vectors and image vectors which are synchronised when outputted cause the generated head to appear to talk.

In an embodiment, a method for emulating a subject is provided that allows a user to interact with a computer generated talking head with the subject's face and voice;
the method comprising:
receiving a user inputted query;
generating a response to a query inputted by a user from the user interface and generate a response to be outputted by the talking head, the response being generated by retrieving information from said personality storage section, said personality storage section comprising content created by or about the subject; and
outputting said response by displaying a talking head which comprises the subject's face and output speech from the mouth of the face with the subject's voice,
wherein said talking head outputs said response by:
converting said response into a sequence of acoustic units using a statistical model, said statistical model comprising a plurality of model parameters, the model parameters describing probability distributions which relate an acoustic unit to an image vector and speech vector, said image vector comprising a plurality of parameters which define the subject's face and said speech vector comprising a plurality of parameters which define the subject's voice,
the talking head appearing to talk by outputting a sequence of speech vectors and image vectors which are synchronised.

Since some methods in accordance with embodiments can be implemented by software, some embodiments encompass computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal.

FIG. 1 is a schematic of a system for emulating a subject. The head of the subject to be emulated is displayed, the head can talk such that speech is outputted by the head and the lips of the head move in synchronisation with the outputted speech. Further, the head is expressive in that, in an embodiment, both the tone of the voice outputted by the head and the expression exhibited by the face of the head demonstrate an emotion.

The system 1 comprises a processor 3 which comprises a program, having 3 sections: a dialogue section 4, an expression deriving section 6 and a talking head generation section 5. The storage 7 stores data which is used by dialogue section 4, the expression deriving section 6 and the talking head generation section 5 to render the head on display 19.

The text to speech system 1 further comprises an input module 11 and an output module 13. The input module 11 is connected to an input for data relating to the speech to be output by the head and the emotion or expression with which the text is to be output. The type of data that is input may take many forms, which will be described in more detail later. The input 15 may be an interface that allows a user to directly input data. Alternatively, the input may be a receiver for receiving data from an external storage medium or a network.

Connected to the output module 13 is output is audiovisual output 17. The output 17 comprises a display 19 which will display the generated head.

In use, the system 1 receives data through data input 15. The program 5 executed on processor 3 converts inputted data into speech to be output by the head and the expression, which the head is to display. The program accesses the storage to select parameters on the basis of the input data. The program renders the head. The head when animated moves its lips in accordance with the speech to be output and displays the desired expression. The head also has an audio output which outputs an audio signal containing the speech. The audio speech is synchronised with the lip or mouth movement of the head.

Figure 2:
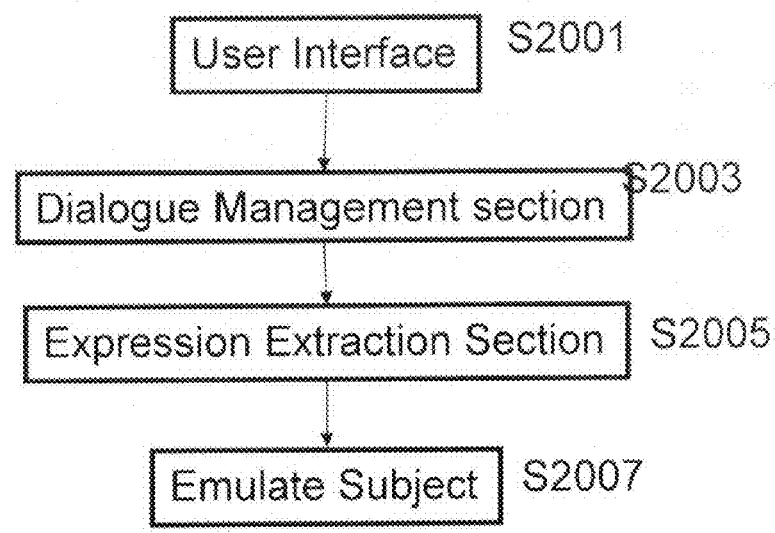
FIG. 2 is a flow diagram showing the steps for the emulated subject to respond to a user query in accordance with an embodiment

FIG. 2 is a flow diagram showing the steps which are performed by the apparatus of FIG. 1. In step S2001. The subject to be emulated will have a pre-stored profile which will be referred to as a personality file. How this information is gathered will be described with reference to FIG. 3. The system will allow a user to converse with an emulated subject. The subject can be someone who is alive today and is providing the emulation in their absence, the subject may have died and the emulation allows a user to converse with a subject who has deceased, the subject may also have been created, for example the dialogue may be derived from one subject, but the appearance and/or voice may be derived from another subject.

The user interface may be provided in a number of different ways. For example, in one embodiment, the user interface allows a user to speak directly to the emulated subject, for example the user interface may comprise an automatic speech recognition system which can convert the spoken language into a form to be processed by the dialogue management section. The user interface may also comprise a gesture interface which will allow the system to recognise the user's gestures for example, the user sitting in position to talk the emulation of the subject, the user shaking their head or performing some other gesture which can be used by the system to control the subject's response.

In a further embodiment, a simpler interface is provided where the user will type the question into the system.

The user interface S2001 will then forward the user input into the dialogue management section S2003. First, the dialogue management section will apply latent semantic analysis in order to understand the query from the user interface S2001. The dialogue management system in accordance with an embodiment of the present invention will be described with reference to FIGS. 5a and 5b.

After response is generated by dialogue management system S2003, the expression extraction section analyses the query in step S2005. This system may determine that no expression is to be using the output query. This subject is then emulated in step S2007.

The system described with reference to FIG. 2, accesses a personality file of the subject which is collected and/or collated as described with reference to FIG. 3.

Figure 3:
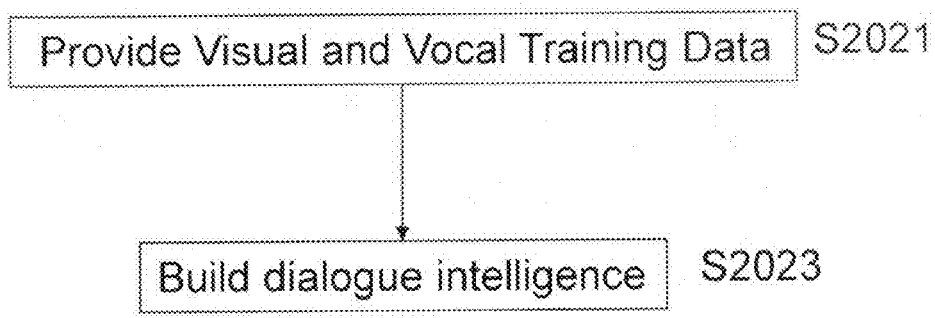
FIG. 3 is a flow diagram showing the basic steps for training a system in accordance with an embodiment.

FIG. 3 is a flow diagram showing the basic steps that are used to collect the data in order to emulate the subject. The subject will read known text in the subjects voice will be recorded. The subjects face will also be captured during the reading of some of this text. However, generally, to train system it will not be necessary to capture as many images as the amount of data required to train the actual voice output. This training of the system to capture facial expression and vocal output will be described in more detail with reference to FIGS. 13 and 14.

Next, data to construct the part of the personality file which is used for the dialogue intelligence/management section will be collected. In one embodiment, this may be achieved by providing the system with specified data such as details of the subject. The user may also provide any information that they specifically wish to be output by the system.

In an embodiment, the subject will provide the system with pointers to data to build the dialogue intelligence. These pointers could range from selected Emails, social media entries such as FACEBOOK, TWITTER, FAQ documents to product related information and so on. The dialogue intelligence module can be configured to use a rule-based approach or an automatic approach.

In a rule-based approach, the user provides data in a question—answer format. Once the query from an end user (person interacting with the system) matches a question, its pre-determined answer will the response spoken by the system.

In the automatic version, the system employs a combination of information retrieval and automatic summarisation techniques to locate an appropriate area of response and form a formal response, respectively.

There are three stages for dialogue intelligence in automatic version: data collation, data curation and response generation. The data collation and data curation steps may be performed when constructing the personality file:

1) Data collection helps the system "personalise" the talking head. This step involves user providing the data to the system and could include information in the form of
   a. Personal content such as Emails, personal articles about a certain subject (or even themselves) which they would want the system to know when used in future)
   b. FAQ or sales information about products
   c. Social media entries such as FACEBOOK posts, blogs, tweets etc.
2) The step of data curation prepares the data for statistical information processing: processing the data into enable them to handle a user-query in a word-vector space models and extract relevant areas from the entire data.
   a. A word vector can be established for each document. Each dimension of the word vector represents a word of the vocabulary in the language of the document. Such a vocabulary may be set by an external input. For example, word-vectors may comprise dimensions set by a vocabulary of 64,000 words. In further embodiments the vocabulary may be restricted, for example, based on words found in the data provided to the system. In an embodiment, the system uses a word vector which has dimensions of 10,000 words. The weighting applied to each dimension can be based on measures such as term frequency–inverse document frequency tf–idf which is a measure of the frequency of a term in a document normalised by a measure of the frequency of the term measured across all of the collected documents.
   b. build an n-gram language model based on a vocabulary (a list of 1 million or so most used words) to build a language model for data, Once an initial model is built, this intelligence can be subsequently ameliorated by adding more information, as deemed required by the user, by interpolating it with a generic language model. In an embodiment, language models are typically stored as trigrams. In one embodiment, a combination of LMs is used. Here, a big generic model LM is built which is used as a background LM. This is built from a massive text from a corpus. Next, smaller LMs on the user-specific text are created. The models can then be interpolated and weighted appropriately; the personality-based smaller LM is typically give higher weight.

Figure 4:
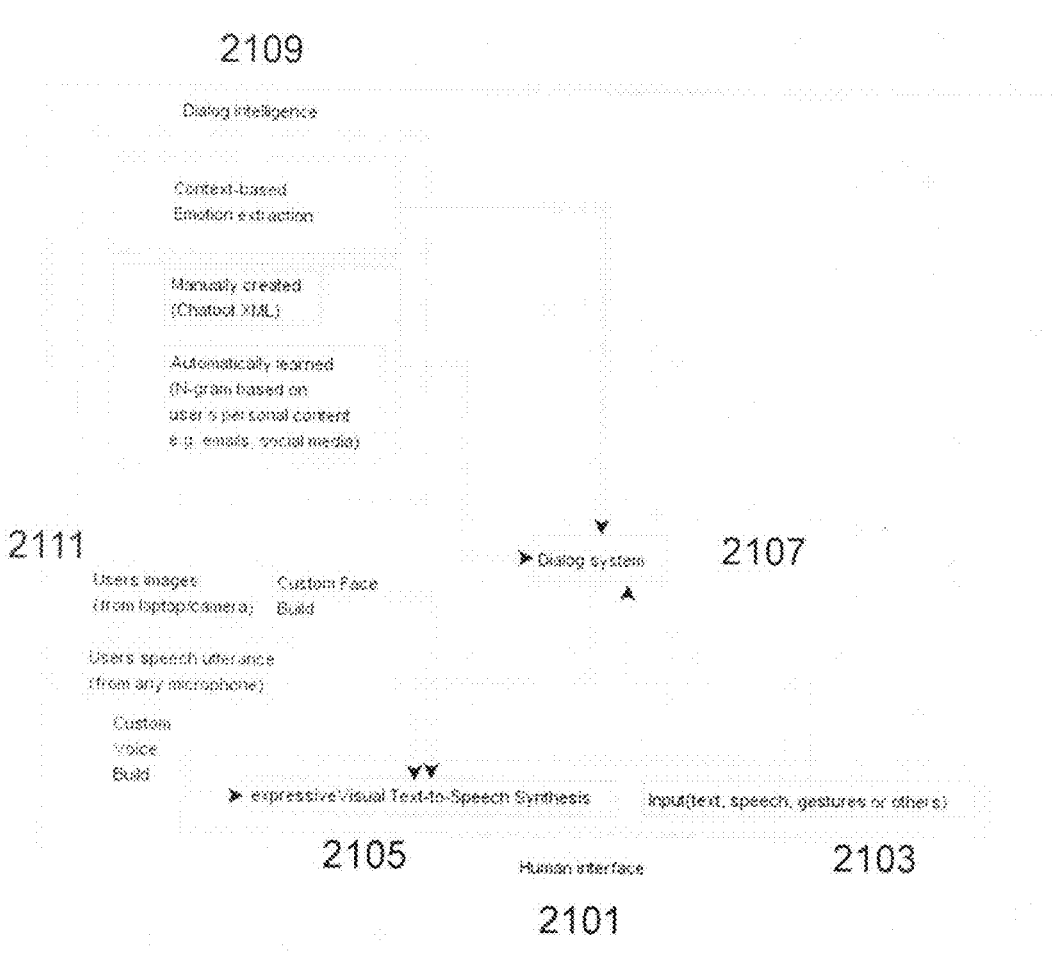
FIG. 4 is a schematic of a system for emulating a subject in accordance with an embodiment.
Figure 5A:
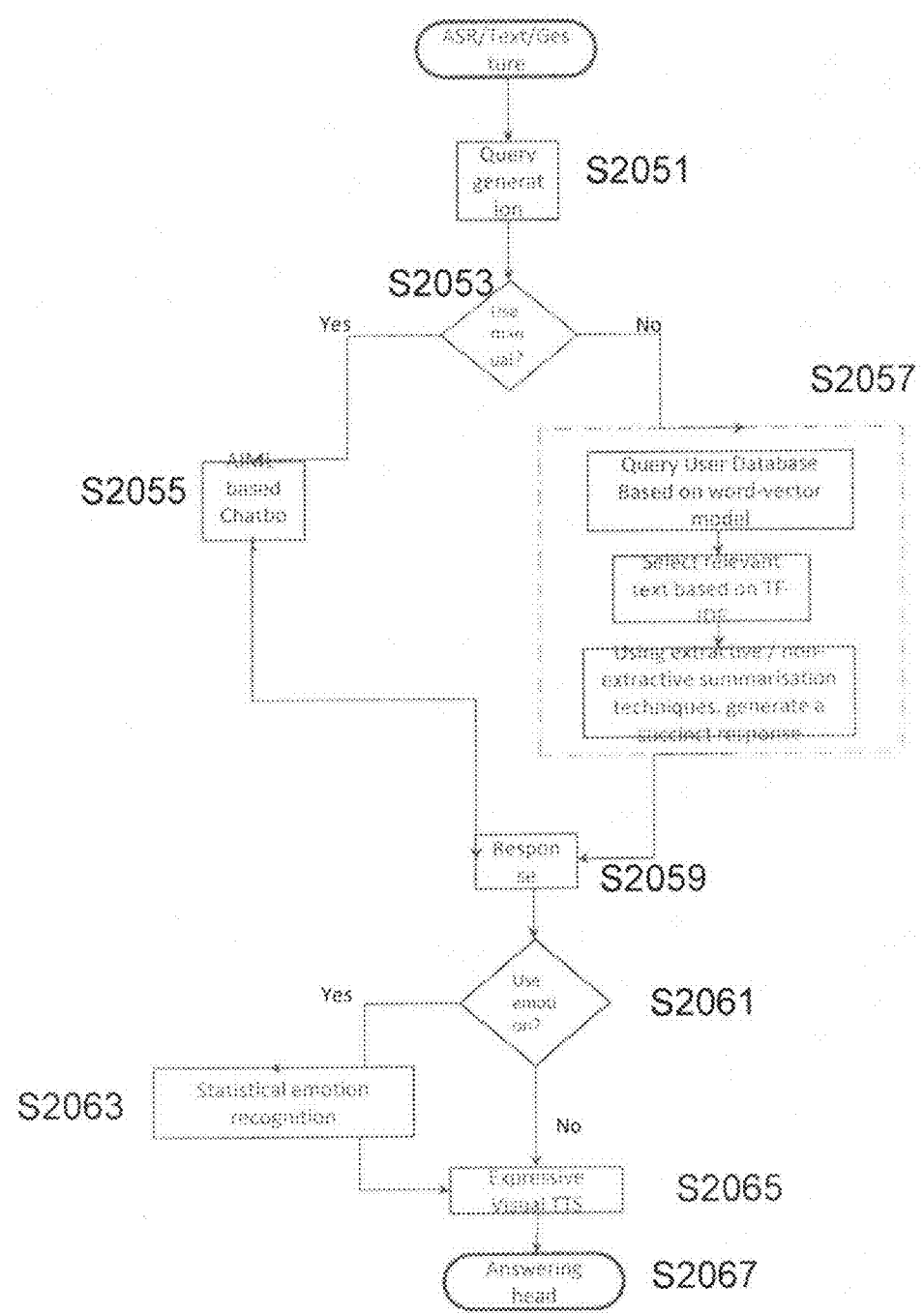
FIG. 5a is a flow diagram showing the steps for an emulated subject to respond to a user query in accordance with a further embodiment and FIG. 5b shows the dialogue intelligence steps of FIG. 5a in more detail.
Figure 5B:
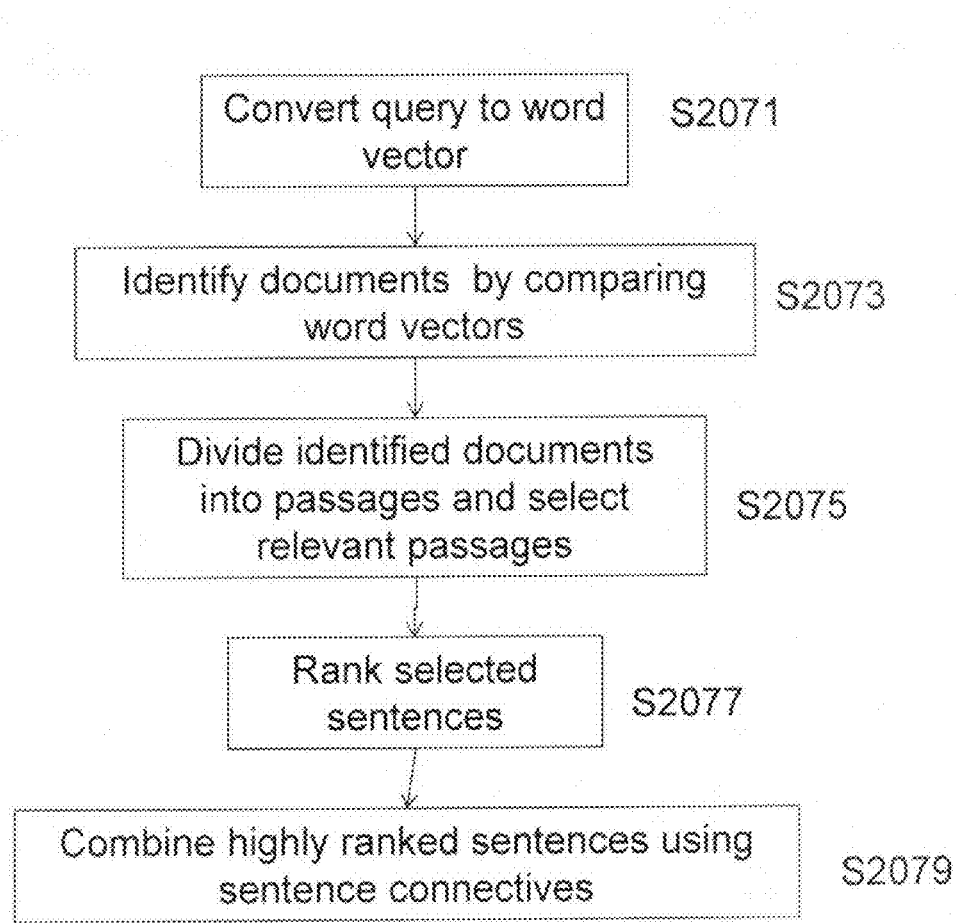

FIG. 4 shows a more detailed diagram of the system described with reference to FIG. 1. FIGS. 5a and 5b show the processing steps which take place in the method of generating a response.

The human interface 2101 comprises two parts, an input section 2103 which can receive an input of text, speech, gestural other input and an output section 2105 when the subjects elation is displayed. These are connected to the dialogue system 2107. The dialogue system 2107 takes the inputted query and generates the response. The dialogue system liaises with dialogue intelligence unit 2109. The dialogue system feeds the response to the expressive visualisation text-to-speech part 2105 of the interface. This takes inputs from section 2109 which generates the subject's voice in section 2111 which generates the subject's face. How the face and voice are synthesised will be described with reference to FIGS. 6 to 14.

The operation of the expression deriving section 6, in accordance with an embodiment, will be described with reference to FIGS. 15 to 18. As the parameters from the expression deriving section 6 are supplied directly to the head generation section 5, the head generation section will be described next to aid understanding of the type of parameters which need to be inputted from the expression deriving section 6.

In the flow-chart of FIG. 5a, the query generated in step S2051 will output to a decision point in step S2053 to determine whether the response provided by the system will be derived from a manual process or whether it will be derived from an automatically generated textual response.

Whether a manual or automatically generated response is used may depend on the settings of the system. For example, the system can be set up as adopting a rule-based approach based on the nature of the enquiry. For example, if the query relates to a commonly asked question, a manual mapping response may be derived. On the other hand if the system is set to automatic response, the data-mining-summarisation aspects generate an appropriate response.

First, a situation where manual response generation is used would be discussed. In this case, in step S2055, the query enters a section where there is a manually created mapping from a question to a specific answer (in the form of the text). This mapping defines different domains setting a course of conversation. It can be implemented as a set of options in AIML, for example in a system such as ALICE or chatbot.

If in step S2053, it is determined not to use the manual mapping, the system will progress to the automatic system in step S2057.

FIG. 5b is a flow diagram that shows a possible method of automatically generating a response in accordance with an embodiment. Here, a query is sent to the user database based on a word-vector model. As described in relation to FIG. 3, word-vectors are generated from documents provided to the personality file. The query can be modified to a word vector using the same dimensions and weighting criteria.

In this word vector model, the query is constructed as a vector in step S2071 and the documents or inputs which are to be searched corresponding to the query are also converted into a vector form. Relevant documents are then selected, using a first comparison section, on the basis of matching the word vector with that of the document vectors in accordance with step S2073. If a term in the query appears in a file to be searched then the component of the vector relating to that word will have a non-zero weighting. One possible model of weighting the components of the vector is to use the term-frequency-inverse document frequency model of TF-IDF model.

In step S2075, the documents, which have been selected are then subdivided into passages and relevant passage from each document are then selected. The passages can be selected, using a second comparison section, by constructing word vectors where the weightings are established using the term frequency—inverse sentence frequency wherein the term frequency is normalised based on the frequency of the word within the document. Once the weightings are established, the vectors can be compared as before.

The output of step S2075 provides sentences that have similarity scores representing their similarity to the word vector of the query. These sentences are then ranked on the basis of these scores and the sentences with the highest scores are selected to form the response in step S2077.

Finally in step S2079, a combination of extractive summarisation (excerpts from the actual text) and non-extractive summarisation (add more information to phrases selected from extractive techniques) are used to produce the response. There are many possible sentence connectors, "and, for, by, before, however" etc. In accordance with an embodiment, the sentence connectors are chosen using a language model. Combinations of the selected sentences with sentence connectives are generated, in a concatenation section, and the perplexity of the total phrase is estimated with sentence connectors that give highest likelihood scores being chosen.

Also the length of response will determine the number of phrases that will be selected. If the average length of a response is 15 words, then phrases with chosen such that they are most relevant to the query from across the document until their cumulative length is about 12-14 words and then these different phrases are combined for a single response.

To illustrate the above, the following example is used:

User query: Flow did you resolve the issue of a feuding family in your times?

The search of the personality file database (comprising of tweets, FACEBOOK entries and personal emails) fetches us the following:
1. Please resolve all issues amicably as it is affecting our reputation . . .
2. Regarding the recent feud for family wealth . . .
3. I loved watching Family Feud episode yesterday . . .
4. . . . you must spend time with your family . . . but during our times . . .

The sentence-ranking algorithm picks up sentences that have maximum "impact" words. As the ranking score is normalised by the length of a sentence, sentences that are both of a good length (not too long, not too short) and contain more vocabulary words are desired. By these criterion, sentences 4. and 3. are ranked lower than 1. and 2.;

In an embodiment, the two sentences could be joined to make an answer or more relevant parts of sentences 1. & 2 could be combined using sentence connectives:

For example, "Resolve all issues amicably, *like*, the recent feud for family wealth . . . "

Regardless whether the system has used the manual step, S2055 or the automatic response generation step S2057, the response is provided in step S2059.

In step S2061, a further decision point is reached as to whether to use emotion. This question point may be set dependent on the use of the system or whether manual the money will or automatic response generation route has been used. Usage of emotion is totally based on the setup of the system. It can be configured on the basis of user requirement. Some usages of the system will not need emotions (e.g., FAQ or Sales related information). At other times when emotion is needed (e.g., a user's personal avatar reading out from a personal blog or email), the system can be configure to emote.

If it is decided that no emotion is to be applied in the output, then the system will proceed to step S2065. Here, the text-to-speech output will be constructed. If it is decided that emotion should be used, the response to be output is evaluated in step S2063. The emotion which the text to be output with can be derived from the text itself. This may be a simple system where the recognition of certain words e.g. happy, etc are automatically tagged with an emotion. In a further embodiment, a statistical method is used to drive emotion from the text, this will be described in more detail with reference to FIGS. 15 to 18. The output of step S2063 is also provided to the expressive visual TTS system in step S2065. Next, the head is rendered in step S2067.

Figure 6:
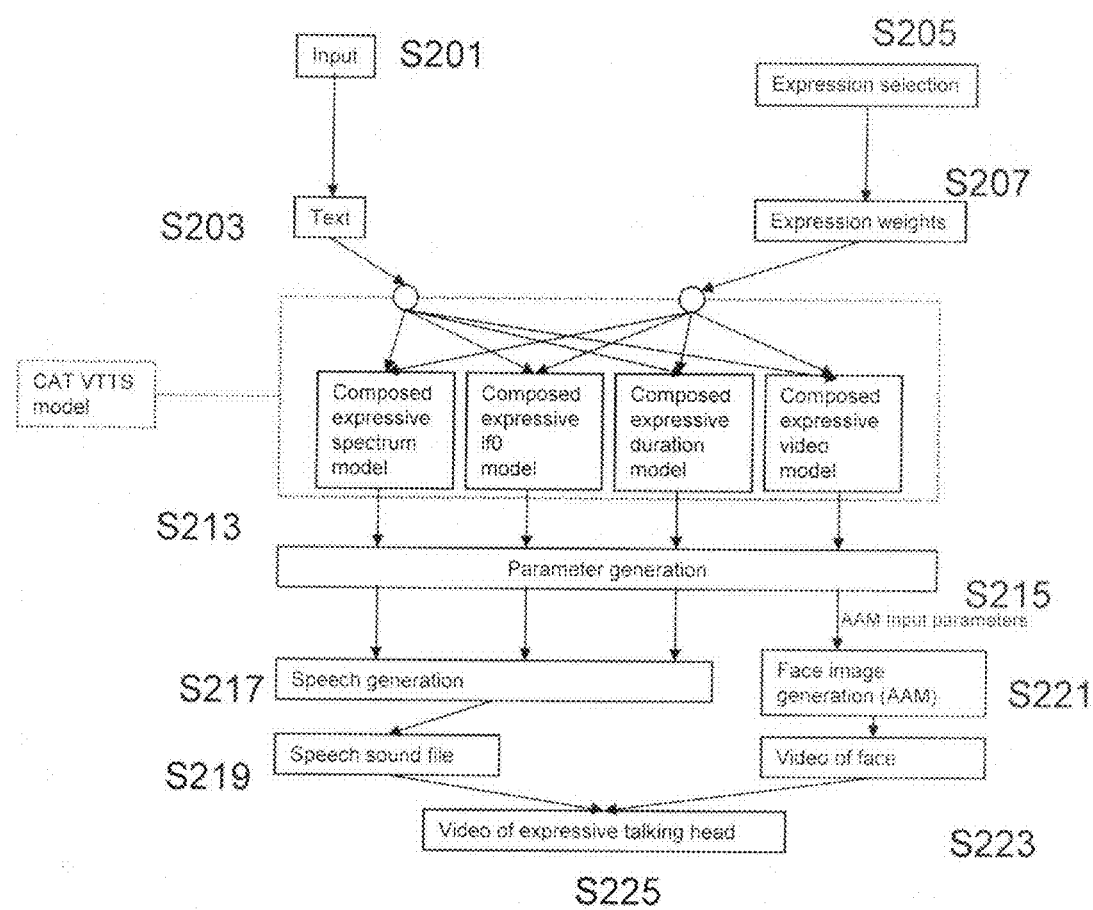
FIG. 6 is a flow diagram showing the basic steps for rendering an animating a generated head to represent the subject in accordance with an embodiment of the invention.

FIG. 6 is a schematic of the basic process for animating and rendering the head. In step S201, the response is received from the dialogue section 4 described above.

In this specific embodiment, the input will be in the form of text S203. However, the input does not need to be a text input, it can be any type of signal which allows the head to be able to output speech. For example, the input could be selected from speech input, video input, combined speech and video input. Another possible input would be any form of index that relates to a set of face/speech already produced, or to a predefined text/expression, e.g. an icon to make the system say "I don't know", "can you repeat that please?" etc.

When text is received as an input, it is then converted into a sequence of acoustic units which may be phonemes, graphemes, context dependent phonemes or graphemes and words or part thereof.

The output of the expression deriving section 6 can be inputted at step S205 and used directly in the rendering/ synthesis or the input can be converted to "expression weights" in step S207 which are used directly in the rendering/synthesis of the current embodiment.

In step S213, the text and expression weights are input into an acoustic model which in this embodiment is a cluster adaptive trained HMM or CAT-HMM.

The text is then converted into a sequence of acoustic units. These acoustic units may be phonemes or graphemes. The units may be context dependent e.g. triphones, quinphones etc. which take into account not only the phoneme which has been selected but the proceeding and following phonemes, the position of the phone in the word, the number of syllables in the word the phone belongs to, etc. The text is converted into the sequence of acoustic units using techniques which are well-known in the art and will not be explained further here.

There are many models available for generating a face. Some of these rely on a parameterisation of the face in terms of, for example, key points/features, muscle structure etc.

Thus, a face can be defined in terms of a "face" vector of the parameters used in such a face model to generate a face. This is analogous to the situation in speech synthesis where output speech is generated from a speech vector. In speech synthesis, a speech vector has a probability of being related to an acoustic unit, there is not a one-to-one correspondence. Similarly, a face vector only has a probability of being related to an acoustic unit. Thus, a face vector can be manipulated in a similar manner to a speech vector to produce a talking head that can output both speech and a visual representation of a character speaking. Thus, it is possible to treat the face vector in the same way as the speech vector and train it from the same data.

The probability distributions are looked up which relate acoustic units to image parameters. In this embodiment, the probability distributions will be Gaussian distributions which are defined by means and variances. Although it is possible to use other distributions such as the Poisson, Student-t, Laplacian or Gamma distributions some of which are defined by variables other than the mean and variance.

Considering just the image processing at first, in this embodiment, each acoustic unit does not have a definitive one-to-one correspondence to a "face vector" or "observation" to use the terminology of the art. Said face vector consisting of a vector of parameters that define the gesture of the face at a given frame. Many acoustic units are pronounced in a similar manner, are affected by surrounding acoustic units, their location in a word or sentence, or are pronounced differently depending on the expression, emotional state, accent, speaking style etc of the speaker. Thus, each acoustic unit only has a probability of being related to a face vector and text-to-speech systems calculate many probabilities and choose the most likely sequence of observations given a sequence of acoustic units.

Figure 7:
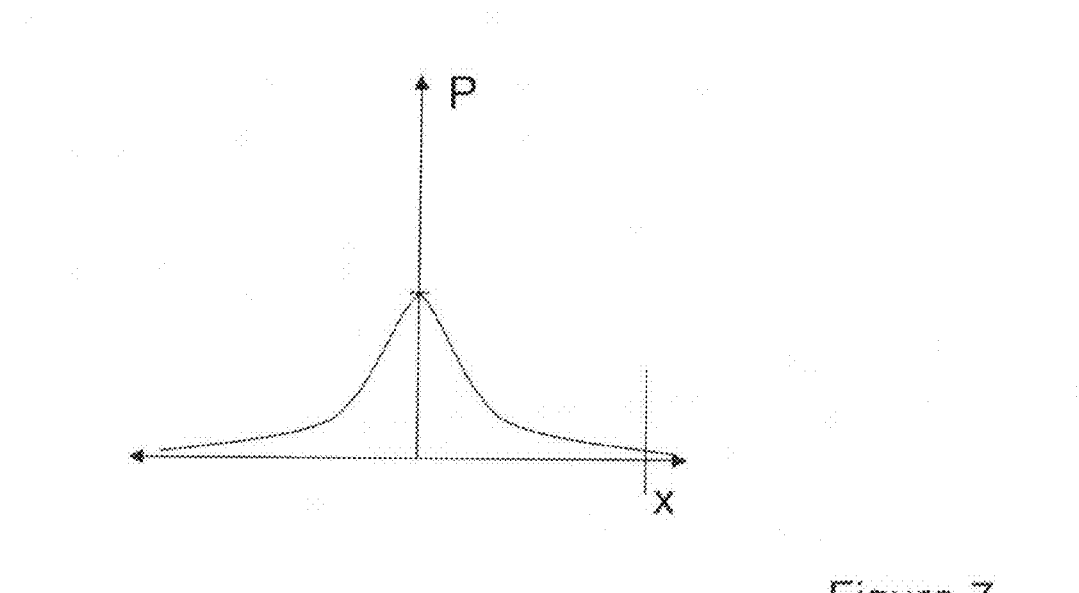
FIG. 7 is a schematic of a Gaussian probability function.

A Gaussian distribution is shown in FIG. 7. FIG. 7 can be thought of as being the probability distribution of an acoustic unit relating to a face vector. For example, the speech vector shown as X has a probability P1 of corresponding to the phoneme or other acoustic unit which has the distribution shown in FIG. 7.

The shape and position of the Gaussian is defined by its mean and variance. These parameters are determined during the training of the system.

These parameters are then used in a model in step S213 which will be termed a "head model". The "head model" is a visual or audio visual version of the acoustic models which are used in speech synthesis. In this description, the head model is a Hidden Markov Model (HMM). However, other models could also be used.

The memory of the talking head system will store many probability density functions relating an to acoustic unit i.e. phoneme, grapheme, word or part thereof to speech parameters. As the Gaussian distribution is generally used, these are generally referred to as Gaussians or components.

In a Hidden Markov Model or other type of head model, the probability of all potential face vectors relating to a specific acoustic unit must be considered. Then the sequence of face vectors which most likely corresponds to the sequence of acoustic units will be taken into account. This implies a global optimization over all the acoustic units of the sequence taking into account the way in which two units affect to each other. As a result, it is possible that the most likely face vector for a specific acoustic unit is not the best face vector when a sequence of acoustic units is considered.

In the flow chart of FIG. 6, a single stream is shown for modelling the image vector as a "compressed expressive video model". In some embodiments, there will be a plurality of different states which will each be modelled using a Gaussian. For example, in an embodiment, the talking head system comprises multiple streams. Such streams might represent parameters for only the mouth, or only the tongue or the eyes, etc. The streams may also be further divided into classes such as silence (sil), short pause (pau) and speech (spe) etc. In an embodiment, the data from each of the streams and classes will be modelled using a HMM. The HMM may comprise different numbers of states, for example, in an embodiment, 5 state HMMs may be used to model the data from some of the above streams and classes. A Gaussian component is determined for each HMM state.

The above has concentrated on the head outputting speech visually. However, the head may also output audio in addition to the visual output. Returning to FIG. 3, the "head model" is used to produce the image vector via one or more streams and in addition produce speech vectors via one or more streams, In FIG. 6 audio streams are shown which are, spectrum, Log F0 and BAP/

Cluster adaptive training is an extension to hidden Markov model text-to-speech (HMM-TTS). HMM-TTS is a parametric approach to speech synthesis which models context dependent speech units (CDSU) using HMMs with a finite number of emitting states, usually five. Concatenating the HMMs and sampling from them produces a set of parameters which can then be re-synthesized into synthetic speech. Typically, a decision tree is used to cluster the CDSU to handle sparseness in the training data. For any given CDSU the means and variances to be used in the HMMs may be looked up using the decision tree.

Figure 8:
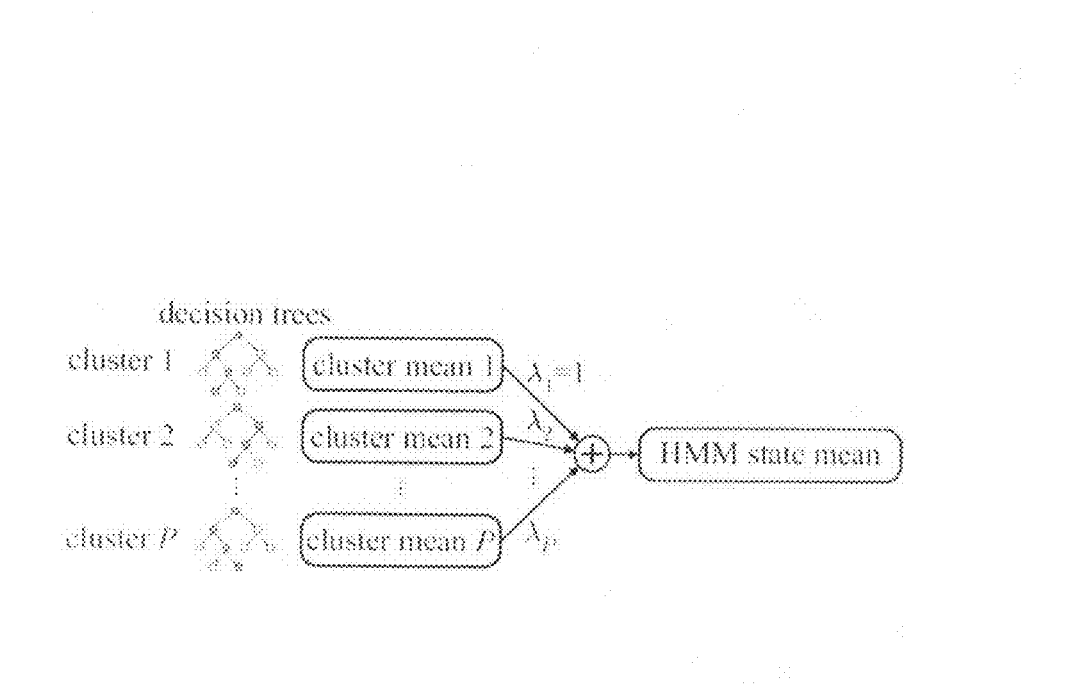
FIG. 8 is a schematic of the clustering data arrangement used in a method in accordance with an embodiment of the present invention.

CAT uses multiple decision trees to capture style- or emotion-dependent information. This is done by expressing each parameter in terms of a sum of weighted parameters where the weighting $\lambda$ is derived from step S207. The parameters are combined as shown in FIG. 8.

Thus, in an embodiment, the mean of a Gaussian with a selected expression (for either speech or face parameters) is expressed as a weighted sum of independent means of the Gaussians.

$$\mu_m^{(s)} = \sum_i \lambda_i^{(s)} \mu_{c(m,i)} \qquad \text{Eqn. 1}$$

where $\mu_m^{(s)}$ is the mean of component m in with a selected expression s, i∈{1, . . . , P} is the index for a cluster with P the total number of clusters, $\lambda_i^{(s)}$ is the expression dependent interpolation weight $i^{th}$ of the cluster for the expression s; $\mu_{c(m,i)}$ is the mean for component m in cluster i. In an embodiment, one of the clusters, for example, cluster i=1, all the weights are always set to 1.0. This cluster is called the 'bias cluster'. Each cluster comprises at least one decision tree. There will be a decision tree for each component in the cluster. In order to simplify the expression, c(m,i)∈{1, . . . N} indicates the general leaf node index for the component m in the mean vectors decision tree for cluster $i^{th}$, with N the total number of leaf nodes across the decision trees of all the clusters. The details of the decision trees will be explained later.

For the head model, the system looks up the means and variances which will be stored in an accessible manner. The head model also receives the expression weightings from step S207. It will be appreciated by those skilled in the art that the voice characteristic dependent weightings may be looked up before or after the means are looked up.

The expression dependent means i.e. using the means and applying the weightings, are then used in a head model in step S213.

The face characteristic independent means are clustered. In an embodiment, each cluster comprises at least one decision tree, the decisions used in said trees are based on linguistic, phonetic and prosodic variations. In an embodiment, there is a decision tree for each component which is a member of a cluster. Prosodic, phonetic, and linguistic contexts affect the facial gesture. Phonetic contexts typically affects the position and movement of the mouth, and prosodic (e.g. syllable) and linguistic (e.g., part of speech of words) contexts affects prosody such as duration (rhythm) and other parts of the face, e.g., the blinking of the eyes. Each cluster may comprise one or more sub-clusters where each sub-cluster comprises at least one of the said decision trees.

The above can either be considered to retrieve a weight for each sub-cluster or a weight vector for each cluster, the components of the weight vector being the weightings for each sub-cluster.

The following configuration may be used in accordance with an embodiment of the present invention. To model this data, in this embodiment, 5 state HMMs are used. The data is separated into three classes for this example: silence, short pause, and speech. In this particular embodiment, the allocation of decision trees and weights per sub-cluster are as follows.

In this particular embodiment the following streams are used per cluster:
Spectrum: 1 stream, 5 states, 1 tree per state×3 classes
Log F0: 3 streams, 5 states per stream, 1 tree per state and stream×3 classes
BAP: 1 stream, 5 states, 1 tree per state×3 classes
VID: 1 stream, 5 states, 1 tree per state×3 classes
Duration: 1 stream, 5 states, 1 tree×3 classes (each tree is shared across all states)
Total: 3×31=93 decision trees For the above, the following weights are applied to each stream per expression characteristic:
Spectrum: 1 stream, 5 states, 1 weight per stream×3 classes
Log F0: 3 streams, 5 states per stream, 1 weight per stream×3 classes
BAP: 1 stream, 5 states, 1 weight per stream×3 classes
VID: 1 stream, 5 states, 1 weight per stream×3 classes
Duration: 1 stream, 5 states, 1 weight per state and stream×3 classes
Total: 3×11=33 weights.

As shown in this example, it is possible to allocate the same weight to different decision trees (VID) or more than one weight to the same decision tree (duration) or any other combination. As used herein, decision trees to which the same weighting is to be applied are considered to form a sub-cluster.

In one embodiment, the audio streams (spectrum, log F0) are not used to generate the video of the talking head during synthesis but are needed during training to align the audio-visual stream with the text.

The following table shows which streams are used for alignment, video and audio in accordance with an embodiment of the present invention.

| Stream | Used for alignment | Used for video synthesis | Used for audio synthesis |
| --- | --- | --- | --- |
| Spectrum | Yes | No | Yes |
| LogF0 | Yes | No | Yes |
| BAP | No | No | Yes (but may be omitted) |
| VID | No | Yes | No |
| Duration | Yes | Yes | Yes |

In an embodiment, the mean of a Gaussian distribution with a selected voice characteristic is expressed as a weighted sum of the means of a Gaussian component, where the summation uses one mean from each cluster, the mean being selected on the basis of the prosodic, linguistic and phonetic context of the acoustic unit which is currently being processed.

Figure 9:
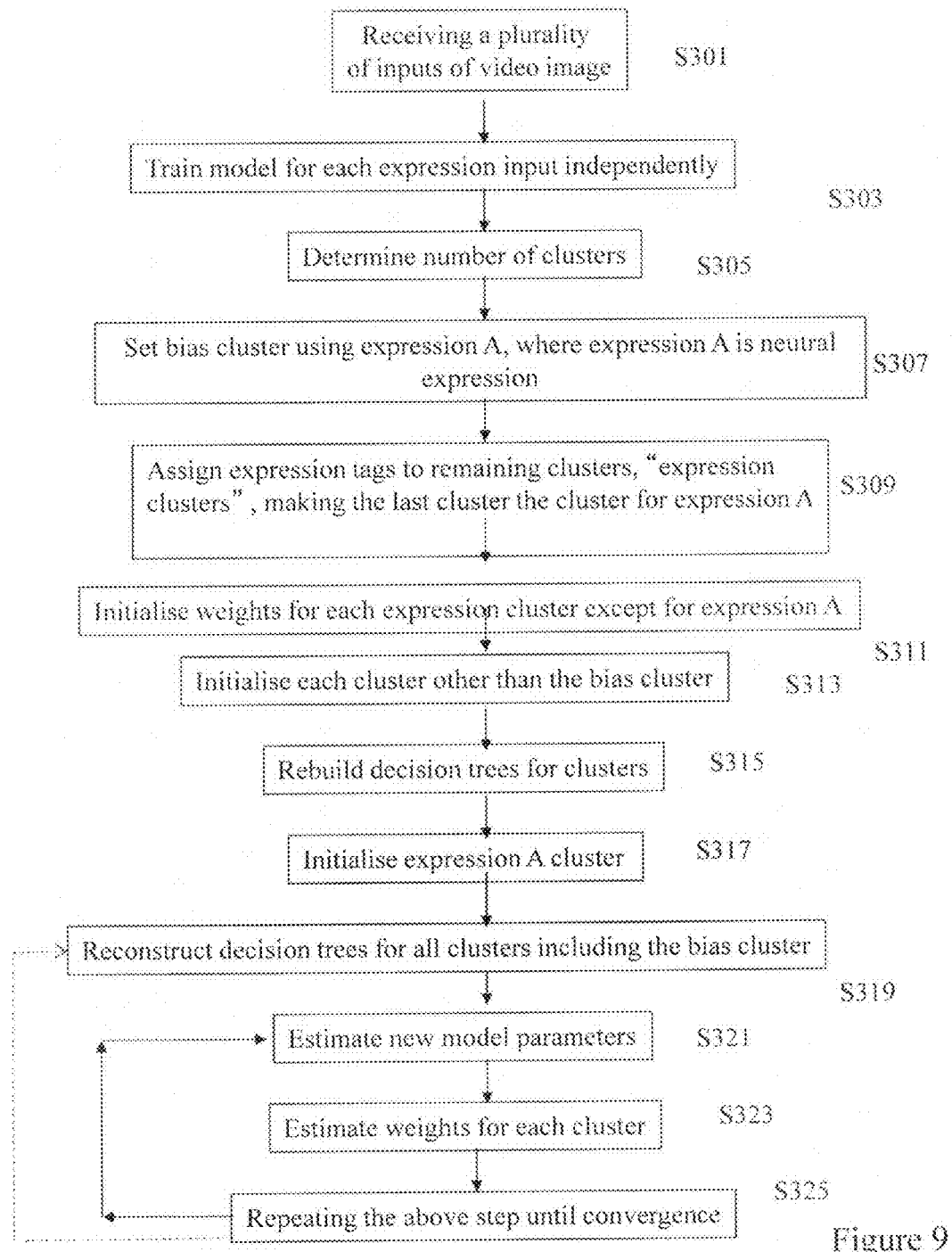
FIG. 9 is a flow diagram demonstrating a method of training a head generation system.

The training of the model used in step S213 will be explained in detail with reference to FIGS. 9 to 11. FIG. 2 shows a simplified model with four streams, 3 related to producing the speech vector (1 spectrum, 1 Log F0 and 1 duration) and one related to the face/VID parameters. (However, it should be noted from above, that many embodiments will use additional streams and multiple streams may be used to model each speech or video parameter. For example, in this figure BAP stream has been removed for simplicity. This corresponds to a simple pulse/noise type of excitation. However the mechanism to include it or any other video or audio stream is the same as for represented streams.) These produce a sequence of speech vectors and a sequence of face vectors which are output at step S215.

The speech vectors are then fed into the speech generation unit in step S217 which converts these into a speech sound file at step S219. The face vectors are then fed into face image generation unit at step S221 which converts these parameters to video in step S223. The video and sound files are then combined at step S225 to produce the animated talking head.

Next, the training of a system in accordance with an embodiment of the present invention will be described with reference to FIG. 9.

In image processing systems which are based on Hidden Markov Models (HMMs), the HMM is often expressed as:

$$M=(A,B,\Pi) \qquad \text{Eqn. 2}$$

where $A=\{a_{ij}\}_{i,j=1}^{N}$ and is the state transition probability distribution, $B=\{b_j(o)\}_{j=1}^{N}$ is the state output probability distribution and $\Pi=\{\pi_i\}_{i=1}^{N}$ is the initial state probability distribution and where N is the number of states in the HMM.

As noted above, the face vector parameters can be derived from a HMM in the same way as the speech vector parameters.

In the current embodiment, the state transition probability distribution A and the initial state probability distribution are determined in accordance with procedures known in the art.

Therefore, the remainder of this description will be concerned with the state output probability distribution.

Generally in talking head systems the state output vector or image vector o(t) from an $m^{th}$ Gaussian component in a model set M is $$P(o(t)|m,s,\mathcal{M}) = N(o(t); \mu_m^{(s)}, \Sigma_m^{(s)}) \quad \text{Eqn. 3}$$

where $\mu^{(s)}_m$ and $\Sigma^{(s)}_m$ are the mean and covariance of the $m^{th}$ Gaussian component for speaker s.

The aim when training a conventional talking head system is to estimate the Model parameter set M which maximises likelihood for a given observation sequence. In the conventional model, there is one single speaker from which data is collected and the emotion is neutral, therefore the model parameter set is $\mu^{(s)}_m = \mu_m$ and $\Sigma^{(s)}_m = \Sigma_m$ for the all components m.

As it is not possible to obtain the above model set based on so called Maximum Likelihood (ML) criteria purely analytically, the problem is conventionally addressed by using an iterative approach known as the expectation maximisation (EM) algorithm which is often referred to as the Baum-Welch algorithm. Here, an auxiliary function (the "Q" function) is derived:

$$Q(\mathcal{M}, \mathcal{M}') = \sum_{m,t} \gamma_m(t) \log p(o, (t), m|\mathcal{M}) \quad \text{Eqn 4}$$

where $\gamma_m(t)$ is the posterior probability of component m generating the observation o(t) given the current model parameters M and M is the new parameter set. After each iteration, the parameter set M' is replaced by the new parameter set M which maximises Q(M, M'). p(o(t), m|M) is a generative model such as a GMM, HMM etc.

In the present embodiment a HMM is used which has a state output vector of:

$$P(o(t)|m,s,\mathcal{M}) = N(o(t); \hat{\mu}_m^{(s)}, \hat{\Sigma}_{v(m)}^{(s)}) \quad \text{Eqn. 5}$$

Where $m \in \{1, \ldots, MN\}$, $t \in \{1, \ldots, T\}$ and $s \in \{1, \ldots, S\}$ are indices for component, time and expression respectively and where MN, T, and S are the total number of components, frames, and speaker expression respectively. Here data is collected from one speaker, but the speaker will exhibit different expressions.

The exact form of $\hat{\mu}_m^{(s)}$ and $\hat{\Sigma}_m^{(s)}$ depends on the type of expression dependent transforms that are applied. In the most general way the expression dependent transforms includes:

a set of expression dependent weights $\lambda_{q(m)}^{(s)}$
a expression-dependent cluster $\mu_{c(m,x)}^{(s)}$
a set of linear transforms $\lfloor A_{r(m)}^{(s)}, b_{r(m)}^{(s)} \rfloor$ After applying all the possible expression dependent transforms in step 211, the mean vector) $\hat{\mu}_m^{(s)}$ and covariance matrix $\hat{\Sigma}_m^{(s)}$ of the probability distribution m for expression s become $$\hat{\mu}_m^{(s)} = A_{r(m)}^{(s)-1}\left(\sum_i \lambda_i^{(s)} \mu_{c(m,i)} + (\mu_{c(m,x)}^{(s)} - b_{r(m)}^{(s)})\right) \quad \text{Eqn 6}$$

$$\hat{\Sigma}_m^{(s)} = (A_{r(m)}^{(s)} \Sigma_{v(m)}^{-1} A_{r(m)}^{(s)})^{-1} \quad \text{Eqn. 7}$$

where $\mu_{c(m,i)}$ are the means of cluster I for component m as described in Eqn. 1, $\mu_{c(m,x)}^{(s)}$ is the mean vector for component m of the additional cluster for the expression s, which will be described later, and $A_{r(m)}^{(s)}$ and $b_{r(m)}^{(s)}$ are the linear transformation matrix and the bias vector associated with regression class r(m) for the expression s.

R is the total number of regression classes and $r(m) \in \{1, \ldots, R\}$ denotes the regression class to which the component m belongs.

If no linear transformation is applied, $A_{r(m)}^{(s)}$ and $b_{r(m)}^{(s)}$ become an identity matrix and zero vector respectively.

For reasons which will be explained later, in this embodiment, the covariances are clustered and arranged into decision trees where $v(m) \in \{1, \ldots, V\}$ denotes the leaf node in a covariance decision tree to which the co-variance matrix of the component m belongs and V is the total number of variance decision tree leaf nodes.

Using the above, the auxiliary function can be expressed as:

$$Q(M, M') = \quad \text{Eqn 8}$$
$$-\frac{1}{2}\sum_{m,t,s} \gamma_m(t)\left\{\log|\hat{\Sigma}_{v(m)}| + (o(t) - \hat{\mu}_m^{(s)})^T \hat{\Sigma}_{v(m)}^{-1} (o(t) - \hat{\mu}_m^{(s)})\right\} + C$$

where C is a constant independent of M

Thus, using the above and substituting equations 6 and 7 in equation 8, the auxiliary function shows that the model parameters may be split into four distinct parts.

The first part are the parameters of the canonical model i.e. expression independent means $\{\mu_n\}$ and the expression independent covariance $\{\Sigma_k\}$ the above indices n and k indicate leaf nodes of the mean and variance decision trees which will be described later. The second part are the expression dependent weights $\{\lambda_i^{(s)}\}_{s,i}$ where s indicates expression and i the cluster index parameter. The third part are the means of the expression dependent cluster $\mu_{c(m,x)}$ and the fourth part are the CMLLR constrained maximum likelihood linear regression transforms $\{A_d^{(s)}, b_d^{(s)}\}_{s,d}$ where s indicates expression and d indicates component or expression regression class to which component in belongs.

In detail, for determining the ML estimate of the mean, the following procedure is performed.

To simplify the following equations it is assumed that no linear transform is applied. If a linear transform is applied, the original observation vectors $\{o_r(t)\}$ have to be substituted by the transformed vectors $$\{\hat{o}_{r(m)}^{(s)}(t) = A_{r(m)}^{(s)} o(t) + b_{r(m)}^{(s)}\} \quad \text{Eqn. 9}$$

Similarly, it will be assumed that there is no additional cluster. The inclusion of that extra cluster during the training is just equivalent to adding a linear transform on which $A_{r(m)}^{(s)}$ is the identity matrix and $\{b_{r(m)}^{(s)} = \mu_{c(m,x)}^{(s)}\}$ First, the auxiliary function of equation 4 is differentiated with respect to $\mu_n$ as follows:

$$\frac{\partial Q(\mathcal{M}:\mathcal{M})}{\partial \mu_n} = k_n - G_{nn}\mu_n - \sum_{v \neq n} G_{nv}\mu_v \quad \text{Eqn. 10}$$

Where $$G_{nv} = \sum_{\substack{m,i,j \\ c(m,i)=n \\ c(m,j)=v}} G_{ij}^{(m)}, \quad k_n = \sum_{\substack{m,i \\ c(m,i)=n}} k_i^{(m)}. \quad \text{Eqn. 11}$$

with $G_{ij}^{(m)}$ and $k_i^{(m)}$ accumulated statistics $$G_{ij}^{(m)} = \sum_{t,s} \gamma_m(t,s) \lambda_{i,q(m)}^{(s)} \Sigma_{v(m)}^{-1} \lambda_{j,q(m)}^{(s)} \quad \text{Eqn. 12}$$

$$k_i^{(m)} = \sum_{t,s} \gamma_m(t,s) \lambda_{i,q(m)}^{(s)} \Sigma_{v(m)}^{-1} o(t).$$

By maximizing the equation in the normal way by setting the derivative to zero, the following formula is achieved for the ML estimate of $\mu_n$ i.e. $\hat{\mu}_n$:

$$\hat{\mu}_n = G_{nn}^{-1}\left(k_n - \sum_{v \neq n} G_{nv}\mu_v\right) \quad \text{Eqn. 13}$$

It should be noted, that the ML estimate of $\mu_n$ also depends on $\mu_k$ where k does not equal n. The index n is used to represent leaf nodes of decisions trees of mean vectors, whereas the index k represents leaf modes of covariance decision trees. Therefore, it is necessary to perform the optimization by iterating over all $\mu_n$ until convergence.

This can be performed by optimizing all $\mu_n$ simultaneously by solving the following equations.

$$\begin{bmatrix} G_{11} & \cdots & G_{1N} \\ \vdots & \ddots & \vdots \\ G_{N1} & \cdots & G_{NN} \end{bmatrix} \begin{bmatrix} \hat{\mu}_1 \\ \vdots \\ \hat{\mu}_N \end{bmatrix} = \begin{bmatrix} k_1 \\ \vdots \\ k_N \end{bmatrix}, \quad \text{Eqn. 14}$$

However, if the training data is small or N is quite large, the coefficient matrix of equation 7 cannot have full rank. This problem can be avoided by using singular value decomposition or other well-known matrix factorization techniques.

The same process is then performed in order to perform an ML estimate of the covariances i.e. the auxiliary function shown in equation (8) is differentiated with respect to $\Sigma_k$ to give:

$$\hat{\Sigma}_k = \frac{\sum_{\substack{t,s,m \\ v(m)=k}} \gamma_m(t,s)\bar{o}(t)\bar{o}(t)^T}{\sum_{\substack{t,s,m \\ v(m)=k}} \gamma_m(t,s)} \quad \text{Eqn. 15}$$

Where $$\bar{o}(t) = o(t) - \mu_m^{(s)} \quad \text{Eqn. 16}$$

The ML estimate for expression dependent weights and the expression dependent linear transform can also be obtained in the same manner i.e. differentiating the auxiliary function with respect to the parameter for which the ML estimate is required and then setting the value of the differential to 0.

For the expression dependent weights this yields $$\lambda_q^{(s)} = \left(\sum_{\substack{t,m \\ q(m)=q}} \gamma_m(t,s) M_m^T \Sigma^{-1} M_m \right)^{-1} \sum_{\substack{t,m \\ q(m)=q}} \gamma_m(t,s) M_m^T \Sigma^{-1} o(t) \quad \text{Eqn. 17}$$

In an embodiment, the process is performed in an iterative manner. This basic system is explained with reference to the flow diagram of FIG. 9.

In step S301 a plurality of inputs of video image are received. In this illustrative example, 1 speaker is used, but the speaker exhibits 3 different emotions when speaking and also speaks with a neutral expression. The data both audio and video is collected so that there is one set of data for the neutral expression and three further sets of data, one for each of the three expressions.

Next, in step S303, an audiovisual model is trained and produced for each of the 4 data sets. The input visual data is parameterised to produce training data. Possible methods are explained in relation to the training for the image model with respect to FIG. 14. The training data is collected so that there is an acoustic unit which is related to both a speech vector and an image vector. In this embodiment, each of the 4 models is only trained using data from one face.

A cluster adaptive model is initialised and trained as follows:

In step S305, the number of clusters P is set to V+1, where V is the number of expressions (4).

In step S307, one cluster (cluster 1), is determined as the bias cluster. In an embodiment, this will be the cluster for neutral expression. The decision trees for the bias cluster and the associated cluster mean vectors are initialised using the expression which in step S303 produced the best model. In this example, each face is given a tag "Expression A (neutral)", "Expression B", "Expression C" and "Expression D", here The covariance matrices, space weights for multi-space probability distributions (MSD) and their parameter sharing structure are also initialised to those of the Expression A (neutral) model.

Each binary decision tree is constructed in a locally optimal fashion starting with a single root node representing all contexts. In this embodiment, by context, the following bases are used, phonetic, linguistic and prosodic. As each node is created, the next optimal question about the context is selected. The question is selected on the basis of which question causes the maximum increase in likelihood and the terminal nodes generated in the training examples.

Then, the set of terminal nodes is searched to find the one which can be split using its optimum question to provide the largest increase in the total likelihood to the training data. Providing that this increase exceeds a threshold, the node is divided using the optimal question and two new terminal nodes are created. The process stops when no new terminal nodes can be formed since any further splitting will not exceed the threshold applied to the likelihood split.

Figure 10:
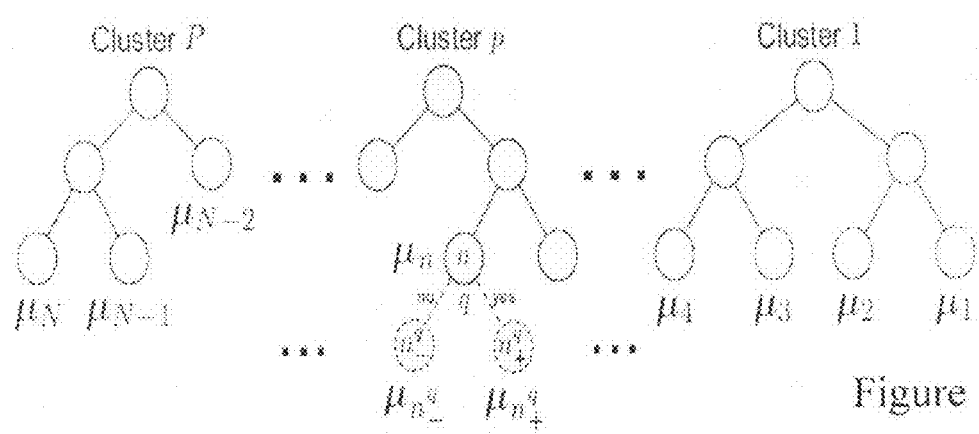
FIG. 10 is a schematic of decision trees used by embodiments in accordance with the present invention.

This process is shown for example in FIG. 10. The nth terminal node in a mean decision tree is divided into two new terminal nodes $n_+^q$ and $n_-^q$ by a question q. The likelihood gain achieved by this split can be calculated as follows:

$$\mathcal{L}(n) = -\frac{1}{2}\mu_n^T\left(\sum_{m \in S(n)} G_{ii}^{(m)}\right)\mu_n + \mu_n^T \sum_{m \in S(n)} \left(k_i^{(m)} - \sum_{j \neq i} G_{ij}^{(m)} \mu_{c(m,j)}\right) \quad \text{Eqn. 18}$$

Where S(n) denotes a set of components associated with node n. Note that the terms which are constant with respect to $\mu_n$ are not included.

Where C is a constant term independent of $\mu_n$. The maximum likelihood of $\mu_n$ is given by equation 13 Thus, the above can be written as:

$$\mathcal{L}(n) = \frac{1}{2}\hat{\mu}_n^T \left( \sum_{m \in S(n)} G_{ii}^{(m)} \right) \hat{\mu}_n \qquad \text{Eqn. 19}$$

Thus, the likelihood gained by splitting node n into $n_+^q$ and $n_-^q$ is given by:

$$\Delta \mathcal{L}(n;q) = \mathcal{L}(n_+^q) + \mathcal{L}(n_-^q) - \mathcal{L}(n) \qquad \text{Eqn. 20}$$

Using the above, it is possible to construct a decision tree for each cluster where the tree is arranged so that the optimal question is asked first in the tree and the decisions are arranged in hierarchical order according to the likelihood of splitting. A weighting is then applied to each cluster.

Decision trees might be also constructed for variance. The covariance decision trees are constructed as follows: If the case terminal node in a covariance decision tree is divided into two new terminal nodes $k_+^q$ and $k_-^q$ by question q, the cluster covariance matrix and the gain by the split are expressed as follows:

$$\Sigma_k = \frac{\sum_{\substack{m,t,s \\ v(m)=k}} \gamma_m(t)\Sigma_v(m)}{\sum_{\substack{m,t,s \\ v(m)=k}} \gamma_m(t)} \qquad \text{Eqn. 21}$$

$$\mathcal{L}(k) = -\frac{1}{2} \sum_{\substack{m,t,s \\ v(m)=k}} \gamma_m(t)\log|\Sigma_k| + D \qquad \text{Eqn. 22}$$

where D is constant independent of $\{\Sigma_k\}$. Therefore the increment in likelihood is $$\Delta \mathcal{L}(k;q) = \mathcal{L}(k_+^q) + \mathcal{L}(k_-^q) - \mathcal{L}(k) \qquad \text{Eqn. 23}$$

In step S309, a specific expression tag is assigned to each of 2, . . . , P clusters e.g. clusters 2, 3, 4, and 5 are for expressions B, C, D and A respectively. Note, because expression A (neutral) was used to initialise the bias cluster it is assigned to the last cluster to be initialised.

In step S311, a set of CAT interpolation weights are simply set to 1 or 0 according to the assigned expression (referred to as "voicetag" below) as:

$$\lambda_i^{(s)} = \begin{cases} 1.0 & \text{if } i = 0 \\ 1.0 & \text{if voicetag}(s) = i \\ 0.0 & \text{otherwise} \end{cases}$$

In this embodiment, there are global weights per expression, per stream. For each expression/stream combination 3 sets of weights are set: for silence, image and pause.

In step S313, for each cluster 2, . . . , (P−1) in turn the clusters are initialised as follows. The face data for the associated expression, e.g. expression B for cluster 2, is aligned using the mono-speaker model for the associated face trained in step S303. Given these alignments, the statistics are computed and the decision tree and mean values for the cluster are estimated. The mean values for the cluster are computed as the normalised weighted sum of the cluster means using the weights set in step S311 i.e. in practice this results in the mean values for a given context being the weighted sum (weight 1 in both cases) of the bias cluster mean for that context and the expression B model mean for that context in cluster 2.

In step S315, the decision trees are then rebuilt for the bias cluster using all the data from all 4 faces, and associated means and variance parameters re-estimated.

After adding the clusters for expressions B, C and D the bias cluster is re-estimated using all 4 expressions at the same time In step S317, Cluster P (Expression A) is now initialised as for the other clusters, described in step S313, using data only from Expression A.

Once the clusters have been initialised as above, the CAT model is then updated/trained as follows.

In step S319 the decision trees are re-constructed cluster-by-cluster from cluster 1 to P, keeping the CAT weights fixed. In step S321, new means and variances are estimated in the CAT model. Next in step S323, new CAT weights are estimated for each cluster. In an embodiment, the process loops back to S321 until convergence. The parameters and weights are estimated using maximum likelihood calculations performed by using the auxiliary function of the Baum-Welch algorithm to obtain a better estimate of said parameters.

As previously described, the parameters are estimated via an iterative process.

In a further embodiment, at step S323, the process loops back to step S319 so that the decision trees are reconstructed during each iteration until convergence.

In a further embodiment, expression dependent transforms as previously described are used. Here, the expression dependent transforms are inserted after step S323 such that the transforms are applied and the transformed model is then iterated until convergence. In an embodiment, the transforms would be updated on each iteration.

FIG. 10 shows clusters 1 to P which are in the forms of decision trees. In this simplified example, there are just four terminal nodes in cluster 1 and three terminal nodes in cluster P. It is important to note that the decision trees need not be symmetric i.e. each decision tree can have a different number of terminal nodes. The number of terminal nodes and the number of branches in the tree is determined purely by the log likelihood splitting which achieves the maximum split at the first decision and then the questions are asked in order of the question which causes the larger split. Once the split achieved is below a threshold, the splitting of a node terminates.

The above produces a canonical model which allows the following synthesis to be performed:

1. Any of the 4 expressions can be synthesised using the final set of weight vectors corresponding to that expression
2. A random expression can be synthesised from the audio-visual space spanned by the CAT model by setting the weight vectors to arbitrary positions.

The above methods demonstrate a system that allows a computer generated head to output speech in a natural manner as the head can adopt and adapt to different expressions. The clustered form of the data allows a system to be built with a small footprint as the data to run the system is stored in a very efficient manner, also the system can easily adapt to new expressions as described above while requiring a relatively small amount of data.

The above has explained in detail how CAT-HMM is applied to render and animate the head. As explained above, the face vector is comprised of a plurality of face parameters. One suitable model for supporting a vector is an active appearance model (AAM), although other statistical models may be used.

An AAM is defined on a mesh of V vertices. The shape of the model, $s=(x_1; y_1; x_2; y_2; x_V; y_V)^T$; defines the 2D position $(x_i; y_i)$ of each mesh vertex and is a linear model given by:

$$s = s_0 + \sum_{i=1}^{M} c_i s_i, \qquad \text{Eqn. 2.1}$$

where $s_0$ is the mean shape of the model, $s_i$ is the $i^{th}$ mode of M linear shape modes and $c_i$ is its corresponding parameter which can be considered to be a "weighting parameter". The shape modes and how they are trained will be described in more detail with reference to FIG. 14. However, the shape modes can be thought of as a set of facial expressions. A shape for the face may be generated by a weighted sum of the shape modes where the weighting is provided by parameter $c_i$.

By defining the outputted expression in this manner it is possible for the face to express a continuum of expressions.

Colour values are then included in the appearance of the model, by $a=(r_1; g_1; b_1; r_2; g_2; b_2; \ldots ; r_P; g_P; b_P)^T$; where $(r_i; g_i; b_i)$ is the RGB representation of the $i^{th}$ of the P pixels which project into the mean shape $s_0$. Analogous to the shape model, the appearance is given by:

$$a = a_0 + \sum_{i=1}^{M} c_i a_i, \qquad \text{Eqn. 2.2}$$

where $a_0$ is the mean appearance vector of the model, and $a_i$ is the $i^{th}$ appearance mode.

In this embodiment, a combined appearance model is used and the parameters $c_i$ in equations 2.1 and 2.1 are the same and control both shape and appearance.

Figure 11:
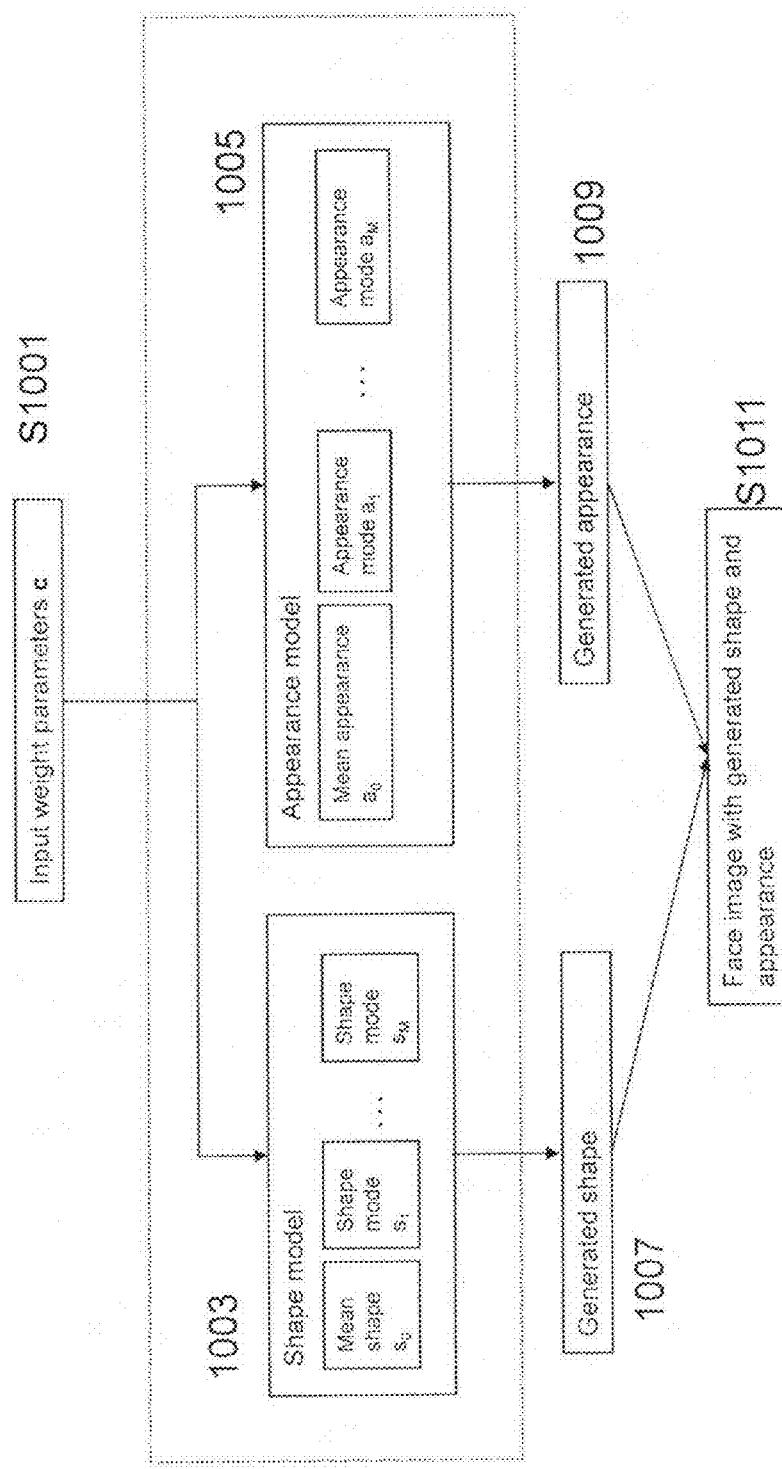
FIG. 11 is an image model which can be used with method and systems in accordance with embodiments of the present invention.

FIG. 11 shows a schematic of such an AAM. Input into the model are the parameters in step S1001. These weights are then directed into both the shape model 1003 and the appearance model 1005.

FIG. 11 demonstrates the modes $s_0, s_1 \ldots s_M$ of the shape model 1003 and the modes $a_0, a_1 \ldots a_M$ of the appearance model. The output 1007 of the shape model 1003 and the output 1009 of the appearance model are combined in step S1011 to produce the desired lace image.

The parameters which are input into this model can be used as the face vector referred to above in the description accompanying FIG. 6 above.

The global nature of AAMs leads to some of the modes handling variations which are due to both 3D pose change as well as local deformation.

In this embodiment AAM modes are used which correspond purely to head rotation or to other physically meaningful motions. This can be expressed mathematically as:

$$s = s_0 + \sum_{i=1}^{K} c_i s_i^{pose} + \sum_{i=K+1}^{M} c_i s_i^{deform}. \qquad \text{Eqn. 2.3}$$

In this embodiment, a similar expression is also derived for appearance. However, the coupling of shape and appearance in AAMs makes this a difficult problem. To address this, during training, first the shape components are derived which model $\{s_i^{pose}\}_{i=1}^{K}$, by recording a short training sequence of head rotation with a fixed neutral expression and applying PCA to the observed mean normalized shapes $\hat{s}=s-s_0$. Next $\hat{s}$ is projected into the pose variation space spanned by $\{s_i^{pose}\}_{i=1}^{K}$ to estimate the parameters $\{c_i\}_{i=1}^{K}$ in equation 2.3 above:

$$c_i = \frac{\hat{s}^T s_i^{pose}}{\|s_i^{pose}\|^2}. \qquad \text{Eqn. 2.4}$$

Having found these parameters the pose component is removed from each training shape to obtain a pose normalized training shape $s^*$:

$$s^* = \hat{s} - \sum_{i=1}^{K} c_i s_i^{pose}. \qquad \text{Eqn. 2.5}$$

If shape and appearance were indeed independent then the deformation components could be found using principal component analysis (PCA) of a training set of shape samples normalized as in equation 2.5, ensuring that only modes orthogonal to the pose modes are found.

However, there is no guarantee that the parameters calculated using equation (2.4 are the same for the shape and appearance modes, which means that it may not be possible to reconstruct training examples using the model derived from them.

To overcome this problem the mean of each $\{c_i\}_{i=1}^{K}$ of the appearance and shape parameters is computed using:

$$c_i = \frac{1}{2}\left(\frac{\hat{s}^T s_i^{pose}}{\|s_i^{pose}\|^2} + \frac{\hat{a}^T a_i^{pose}}{\|a_i^{pose}\|^2}\right). \qquad \text{Eqn. 2.6}$$

The model is then constructed by using these parameters in equation 2.5 and finding the deformation modes from samples of the complete training set.

In further embodiments, the model is adapted for accommodate local deformations such as eye blinking. This can be achieved by a modified version of the method described in which model blinking are learned from a video containing blinking with no other head motion.

Directly applying the method taught above for isolating pose to remove these blinking modes from the training set may introduce artefacts. The reason for this is apparent when considering the shape mode associated with blinking in which the majority of the movement is in the eyelid. This means that if the eyes are in a different position relative to the centroid of the face (for example if the mouth is open, lowering the centroid) then the eyelid is moved toward the mean eyelid position, even if this artificially opens or closes the eye. Instead of computing the parameters of absolute coordinates in equation 2.6, relative shape coordinates are implemented using a Laplacian operator:

$$c_i^{blink} = \frac{1}{2}\left(\frac{L(\hat{s})^T L(s_i^{blink})}{\|L(s_i^{blink})\|^2} + \frac{\hat{a}^T a_i^{blink}}{\|a_i^{blink}\|^2}\right). \qquad \text{Eqn. 2.7}$$

The Laplacian operator L( ) is defined on a shape sample such that the relative position, $\delta_i$ of each vertex i within the shape can be calculated from its original position $p_i$ using $$\delta_i = \sum_{j \in N} \frac{p_i - p_j}{\|d_{ij}\|^2}, \qquad \text{Eqn. 2.8}$$

where N is a one-neighbourhood defined on the AAM mesh and $d_{ij}$ is the distance between vertices i and j in the mean shape. This approach correctly normalizes the training samples for blinking, as relative motion within the eye is modelled instead of the position of the eye within the face.

Further embodiments also accommodate for the fact that different regions of the face can be moved nearly independently. It has been explained above that the modes are decomposed into pose and deformation components. This allows further separation of the deformation components according to the local region they affect. The model can be split into R regions and its shape can be modelled according to:

$$s = s_0 + \sum_{i=1}^{K} c_i s_i^{pose} + \sum_{j=1}^{R} \sum_{i \in I_j} c_i s_i^j, \qquad \text{Eqn. 2.9}$$

where $I_j$ is the set of component indices associated with region j. In one embodiment, modes for each region are learned by only considering a subset of the model's vertices according to manually selected boundaries marked in the mean shape. Modes are iteratively included up to a maximum number, by greedily adding the mode corresponding to the region which allows the model to represent the greatest proportion of the observed variance in the training set.

An analogous model is used for appearance. Linearly blending is applied locally near the region boundaries. This approach is used to split the face into an upper and lower half. The advantage of this is that changes in mouth shape during synthesis cannot lead to artefacts in the upper half of the face. Since global modes are used to model pose there is no risk of the upper and lower halves of the face having a different pose.

Figure 12A:
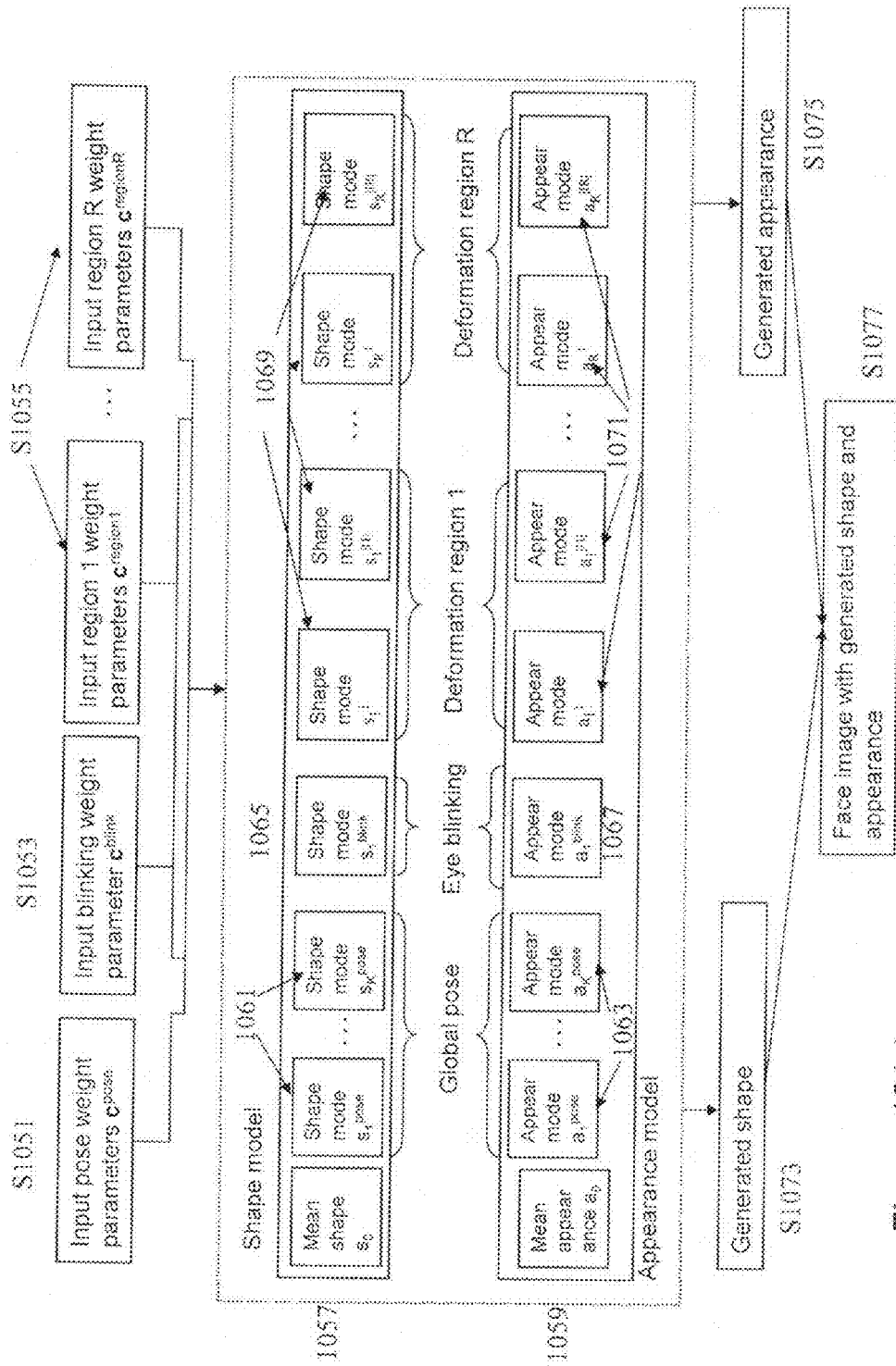
FIG. 12(a) is a variation on the model of FIG. 11.

FIG. 12(a) demonstrates the enhanced AAM as described above. As for the AAM of FIG. 11, the input weightings for the AAM of FIG. 12(a) can form a face vector to be used in the algorithm described with reference to FIG. 6.

However, here the input parameters ci are divided into parameters for pose which are input at S1051, parameters for blinking S1053 and parameters to model deformation in each region as input at S1055. In FIG. 12, regions 1 to R are shown.

Next, these parameters are fed into the shape model 1057 and appearance model 1059. Here:
the pose parameters are used to weight the pose modes 1061 of the shape model 1057 and the pose modes 1063 of the appearance model;
the blink parameters are used to weight the blink mode 1065 of the shape model 1057 and the blink mode 1067 of the appearance model; and
the regional deformation parameters are used to weight the regional deformation modes 1069 of the shape model 1057 and the regional deformation modes 1071 of the appearance model.

As for FIG. 11, a generated shape is output in step S1073 and a generated appearance is output in step S1075. The generated shape and generated appearance are then combined in step S1077 to produce the generated image.

Since the teeth and tongue are occluded in many of the training examples, the synthesis of these regions may cause significant artefacts. To reduce these artefacts a fixed shape and texture for the upper and lower teeth is used. The displacements of these static textures are given by the displacement of a vertex at the centre of the upper and lower teeth respectively. The teeth are rendered before the rest of the face, ensuring that the correct occlusions occur.

Figure 12B:
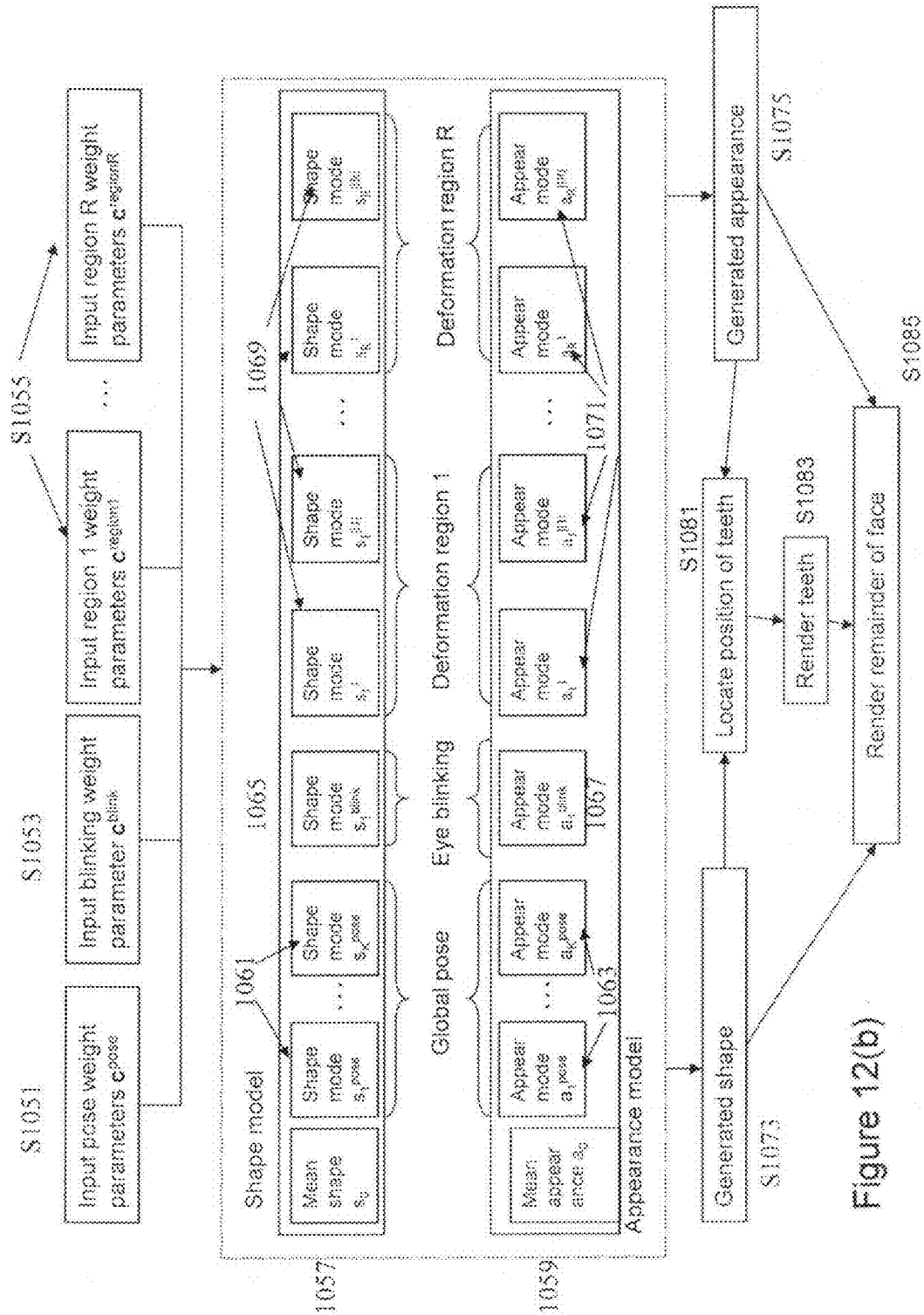
FIG. 12(b) is a variation on the model of FIG. 12(a)

FIG. 12(b) shows an amendment to FIG. 12(a) where the static artefacts are rendered first. After the shape and appearance have been generated in steps S1073 and S1075 respectively, the position of the teeth are determined in step S1081. In an embodiment, the teeth are determined to be at a position which is relative to a fixed visible point on the face. The teeth are then rendered by assuming a fixed shape and texture for the teeth in step S1083. Next the rest of the face is rendered in step S1085.

Figure 13:
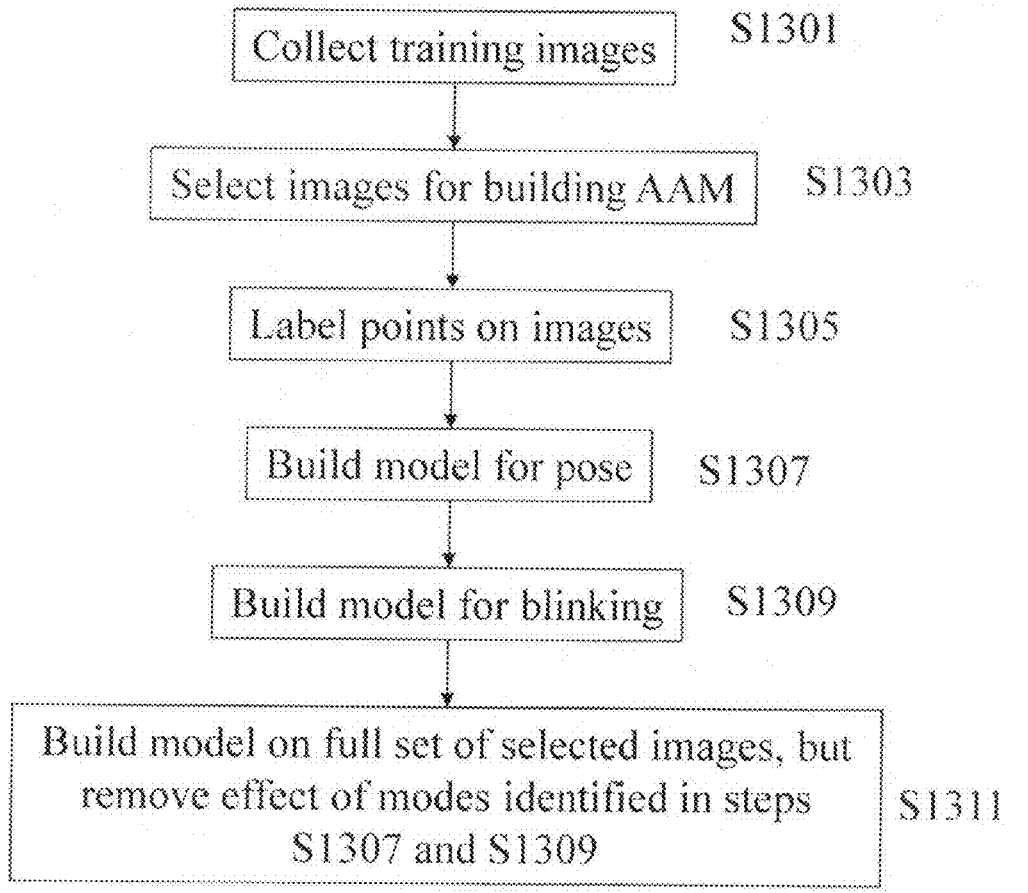
FIG. 13 is a flow diagram showing the training of the model of FIGS. 12(a) and (b)

FIG. 13 is a flow diagram showing the training of the system in accordance with an embodiment of the present invention. Training images are collected in step S1301. In one embodiment, the training images are collected covering a range of expressions. For example, audio and visual data may be collected by using cameras arranged to collect the subject's facial expression and microphones to collect audio.

The subject who wishes to be emulated by the system can read out sentences and will receive instructions on the emotion or expression which needs to be used when reading a particular sentence.

The data is selected so that it is possible to select a set of frames from the training images which correspond to a set of common phonemes in each of the emotions. In some embodiments, about 7000 training sentences are used. However, much of this data is used to train the speech model to produce the speech vector as previously described.

In addition to the training data described above, further training data is captured to isolate the modes due to pose change. For example, video of the speaker rotating their head may be captured while keeping a fixed neutral expression.

Also, video is captured of the speaker blinking while keeping the rest of their face still.

In step S1303, the images for building the AAM are selected. In an embodiment, only about 100 frames are required to build the AAM. The images are selected which allow data to be collected over a range of frames where the subject exhibits a wide range of emotions. For example, frames may be selected where the subject demonstrates different expressions such as different mouth shapes, eyes open, closed, wide open etc. In one embodiment, frames are selected which correspond to a set of common phonemes in each of the emotions to be displayed by the head.

In further embodiments, a larger number of frames could be use, for example, all of the frames in a long video sequence. In a yet further embodiment frames may be selected where the subject has performed a set of facial expressions which roughly correspond to separate groups of muscles being activated.

In step S1305, the points of interest on the frames selected in step S1303 are labelled. In an embodiment this is done by visually identifying key points on the face, for example eye corners, mouth corners and moles or blemishes. Some contours may also be labelled (for example, face and hair silhouette and lips) and key points may be generated automatically from these contours by equidistant subdivision of the contours into points.

In other embodiments, the key points are found automatically using trained key point detectors. In a yet further embodiment, key points are found by aligning multiple face images automatically. In a yet further embodiment, two or more of the above methods can be combined with hand labelling so that a semi-automatic process is provided by inferring some of the missing information from labels supplied by a user during the process.

In step S1307, the frames which were captured to model pose change are selected and an AAM is built to model pose alone.

Next, in step S1309, the frames which were captured to model blinking are selected AAM modes are constructed to mode blinking alone.

Next, a further AAM is built using all of the frames selected including the ones used to model pose and blink, but before building the model, the effect of k modes was removed from the data as described above.

Frames where the AAM has performed poorly are selected. These frames are then hand labelled and added to the training set. The process is repeated until there is little further improvement adding new images.

The AAM has been trained once all AAM parameters for the modes—pose, blinking and deformation have been established.

Figure 14:
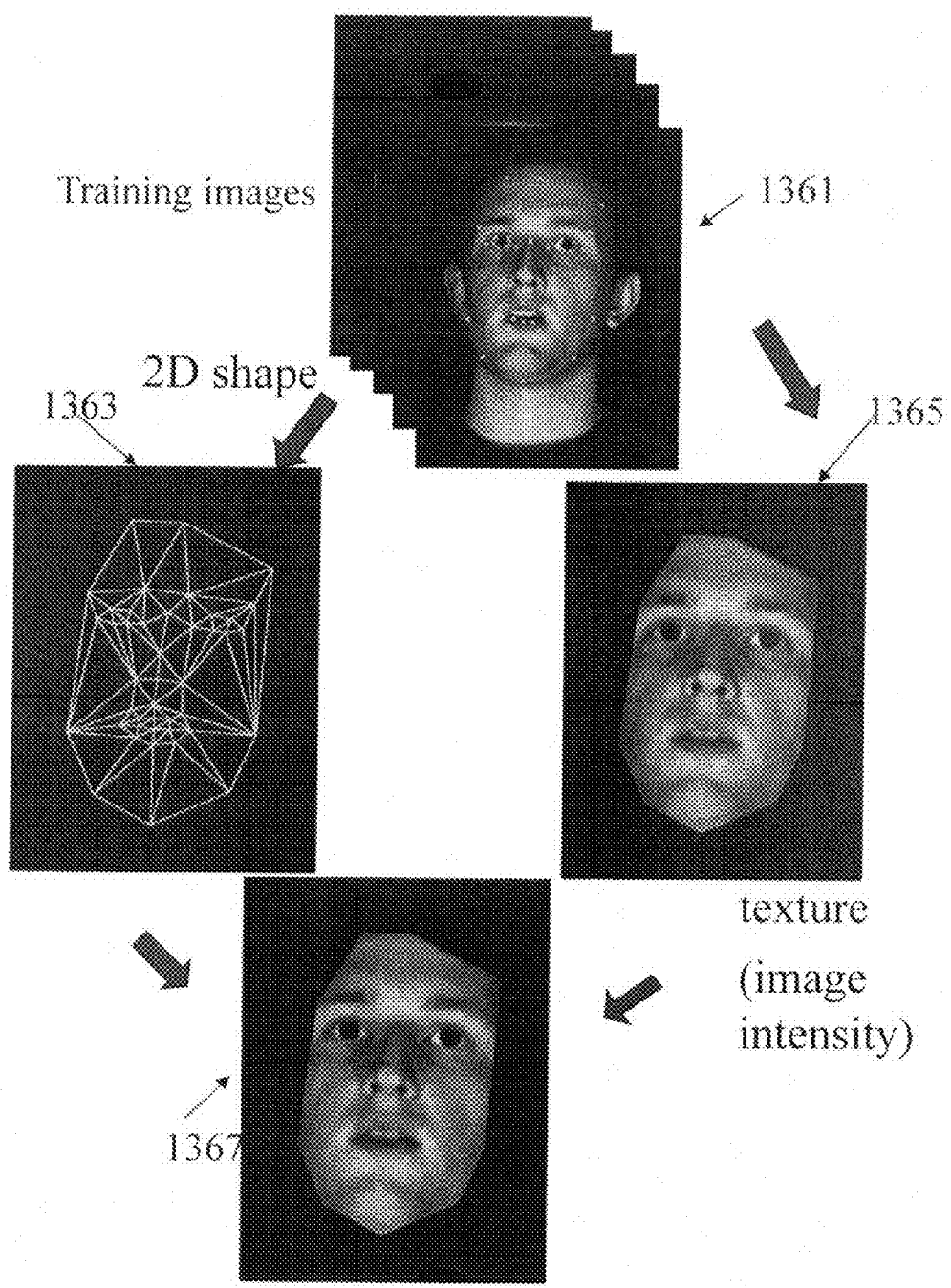
FIG. 14 is a schematic showing the basics of the training described with reference to FIG. 13.

FIG. 14 is a schematic of how the AAM is constructed. The training images 1361 are labelled and a shape model 1363 is derived. The texture 1365 is also extracted for each face model. Once the AAM modes and parameters are calculated as explained above, the shape model 1363 and the texture model 365 are combined to generate the face 1367.

In one embodiment, the AAM parameters and their first time derivates are used at the input for a CAT-HMM training algorithm as previously described.

In a further embodiment, the spatial domain of a previously trained AAM is extended to further domains without affecting the existing model. For example, it may be employed to extend a model that was trained only on the face region to include hair and ear regions in order to add more realism.

A set of N training images for an existing AAM are known, as are the original model coefficient vectors $\{c_j\}_{j=1}^{N}$ $c_j \in R^M$ for these images. The regions to be included in the model are then labelled, resulting in a new set of N training shapes $\{\tilde{s}_j^{ext}\}_{j=1}^{N}$ and appearances $\{\tilde{a}_j^{ext}\}_{j=1}^{N}$. Given the original model with M modes, the new shape modes $\{s_i\}_{i=1}^{M}$, should satisfy the following constraint:

$$\begin{bmatrix} c_1^T \\ \vdots \\ c_N^T \end{bmatrix} \begin{bmatrix} s_1^T \\ \vdots \\ s_M^T \end{bmatrix} = \begin{bmatrix} (\tilde{s}_1^{ext})^T \\ \vdots \\ (\tilde{s}_N^{ext})^T \end{bmatrix}, \quad \text{Eqn. 2.10}$$

which states that the new modes can be combined, using the original model coefficients, to reconstruct the extended training shapes $\tilde{s}_j^{ext}$. Assuming that the number of training samples N is larger than the number of modes M, the new shape modes can be obtained as the least-squares solution. New appearance modes are found analogously.

Figure 15:
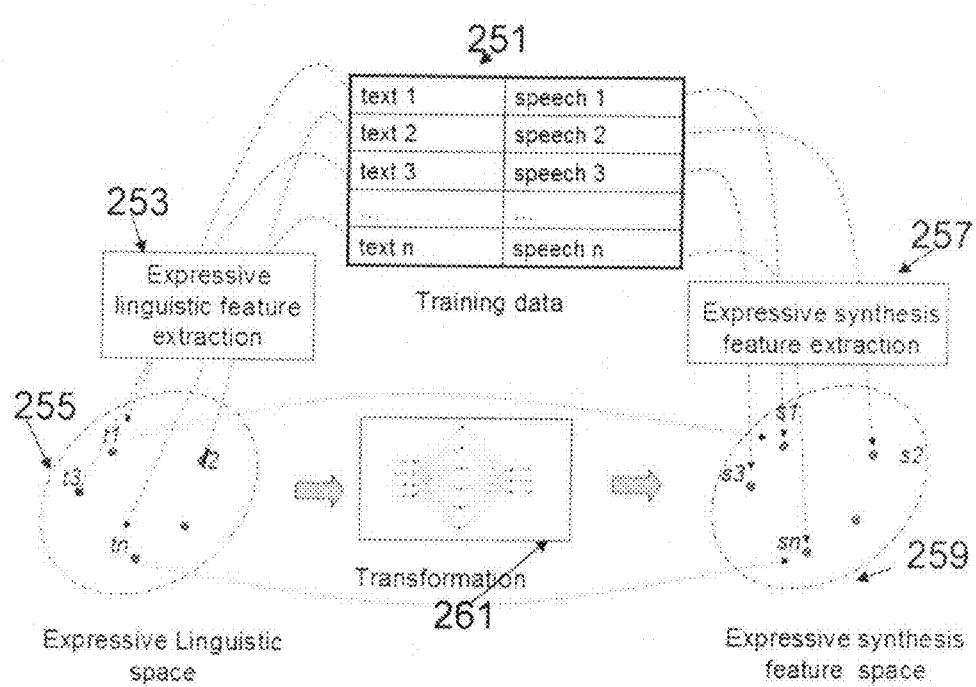
FIG. 15 is a schematic of a system for extracting an expressive synthesis vector.

In an embodiment, the head generating system requires input from the expression deriving section. FIG. 15 shows one embodiment for training the expression deriving section to extract expression from the training data. Training data 251 is provided with text and speech corresponding to the text input. The training data can be the same training data that is used to train the above CAT model. In one embodiment, the training data is the same as the CAT training data.

It is assumed that each utterance in the training data 251 contains unique expressive information. This unique expressive information can be determined from the speech data and can be read from the transcription of the speech, i.e. the text data as well. In the training data, the speech sentences and text sentences are synchronized as shown in FIG. 15.

An "expressive linguistic feature extraction" block 253 is provided which converts each text sentence in the training data into a vector which will be termed an expressive linguistic feature vector.

Any text sentences can be converted as a linguistic feature through expressive linguistic feature extraction block 253, and all the possible expressive linguistic features construct a first space 255 which will be called an expressive linguistic space. Each transcription of the training sentence can be viewed as a point in this expressive linguistic space. The expressive linguistic feature vector should catch the emotion information in text sentences.

During training, as well as extracting expressive linguistic features from the text, an "expressive synthesis feature extraction" block 257 is provided which converts each speech sentence into a vector which will be called an expressive synthesis feature vector.

Any speech sentences can be converted as an expressive synthesis feature through "expressive synthesis feature extraction" block 257, and all the possible expressive synthesis features construct an expressive synthesis space 259. The requirement to the expressive synthesis feature is that it should catch the unique expressive information of original speech sentence; meanwhile, this expressive information can be re-generated in the synthesis process.

Given the linguistic features from transcription of training data and the synthesis features from training speech sentences, methods and systems in accordance with embodiments of the present invention train a transformation 261 to transform a linguistic feature vector in linguistic feature space 255 to a synthesis feature vector in synthesis feature space 259.

In the synthesis stage, the "expressive linguistic feature extraction" block 253 converts the text to be synthesized into a linguistic feature vector in linguistic feature space 255, then through the transformation block 261, the linguistic feature is mapped to a synthesis feature in expressive synthesis space 259. This synthesis feature vector contains the emotion information in original text data and can be used by the head generation section of FIG. 6, directly to synthesize the expressive speech.

In an embodiment, machine learning methods, e.g. neural network (NN) are used to provide the transformation block 261 and train the transformations from expressive linguistic space 255 to expressive synthesis space 259. For each sentence in the training data 251, the speech data is used to generate an expressive synthesis feature vector in synthesis feature space 259 and the transcription of the speech data is used to generate an expressive linguistic feature in linguistic feature space 255. Using the linguistic features of the training data as the input of NN and the synthesis features of the training data as the target output, the parameters of the NN can be updated to learn the mapping from linguistic feature space to synthesis feature space.

The "linguistic feature extraction" block 253 converts the text data into a linguistic feature vector. This feature vector should contain the discriminative information, i.e. if two text data contains different emotion, their linguistic features should be distinguishable in the linguistic features space.

In one embodiment, Bag-of-word (BoW)/word-vector space models are be used to generate the linguistic feature. BoW methods express the text data as vector of word frequencies. The dimension of the vector is equal to the size of vocabulary and each element contains the frequency of a particular word in vocabulary. Different well-developed BoW technologies can be applied, e.g. latent semantic analysis (LSA), probabilistic latent semantic analysis (pLSA), latent Dirichlet allocation (LDA) etc. Through these technologies, the original word frequency vector whose dimension is equal to vocabulary size can be compacted in very low dimension.

In a further embodiment, in order to model the emotion information in text data more accurately, different levels of knowledge from the text data are used to generate the linguistic features.

In one embodiment, not only the word level information, but also the lower level information such as full context phone sequence and the higher level information such as part-of-speech (POS), narration styles are to be used to generate the linguistic features.

To combine the information from the different levels together, in one embodiment, a parallel structure is used as shown in FIG. 15. In the parallel structure, the features in different levels are extracted separately, and then the features in different levels are concatenated to one big vector to be the input for the transformation block.

Figure 16:
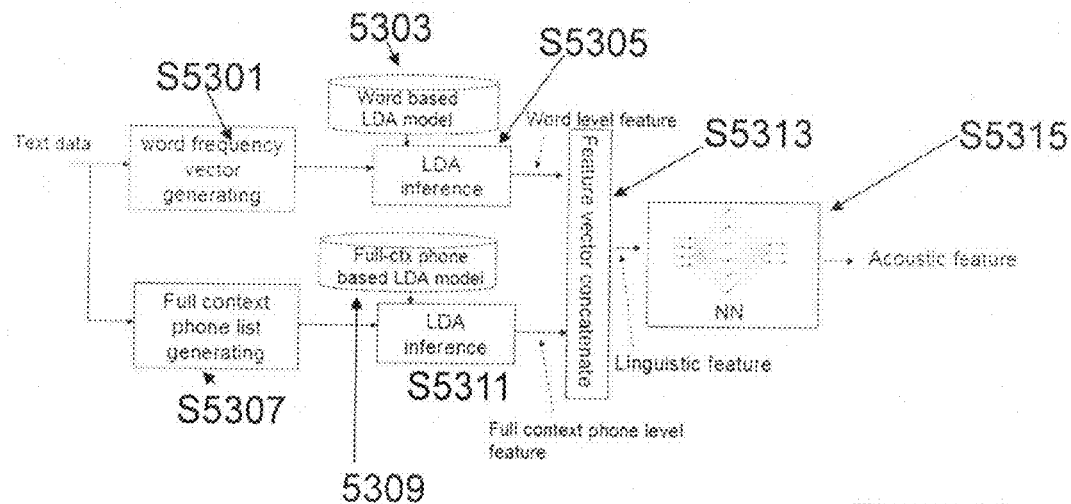
FIG. 16 is a schematic of a system for extracting expressive features using different levels of knowledge information.

FIG. 16 illustrates a parallel structure for extracting linguistic features which may be used in a system in accordance with an embodiment. Text data are converted into a word frequency vector in step S5301. Next, an LDA model 5303 with words as units is used at step S5305 to convert the word frequency vector into a word level feature vector. In step S5305, variantial posterior dirichlet parameters are estimated through an inference process.

At the same time, text data is converted as a sequence of full context phones in step S5307. This full context phone sequence is converted into a full context phone level feature vector in S5311 using a LDA model 5309 with full context phones as units.

Then the word level feature vector and the full context phone level feature vector are concatenated as linguistic features to form the linguistic feature vector in S5313. The feature vector is then mapped via the NN in S5315 to the expression parameters to be used in the system of FIG. 6.

FIG. 16 is used to show an example of how to extract linguistic features. In further embodiments, higher level knowledge such as POS, narration style and any other useful information from text data can be integrated into linguistic feature.

Further, BoW methods other than LDA can be used to extract linguistic feature as well.

Linguistic features determined from different levels of information can also be combined using a hierarchical structure as well. In one embodiment of such a hierarchical structure, linguistic features with different levels of knowledge are incorporated into the system with a cascade of NNs, as shown in FIG. 17.

Figure 17:
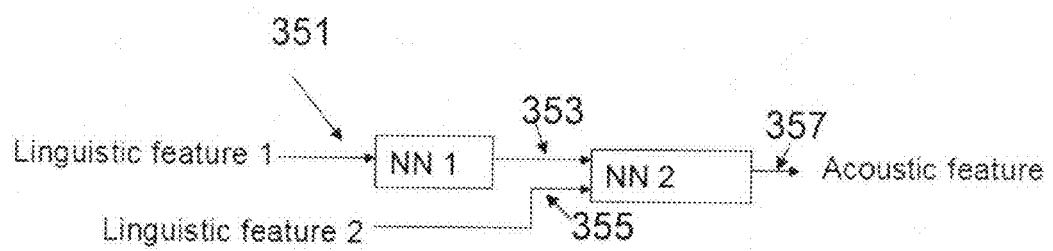
FIG. 17 is a schematic of a system for extracting expressive features using cascading neural networks to model different levels of knowledge.

In FIG. 17, the linguistic feature 1 and linguistic feature 2 represent linguistic features determined from different levels of knowledge, e.g. word level feature, full context phone level feature etc.

Feature 1 is used as input 351 of NN1. Then, the output 353 of NN1 is combined with feature 2 as input 355 of NN2 to generate the acoustic feature at output 357.

Returning to FIG. 15, the expressive synthesis feature extraction block 257 is used to represent the expressive information of the speech data. Each point in the expressive synthesis feature space 259 represents unique expressive information in speech.

In an embodiment, the above described head generation system uses "expression weights" to introduce expression into both the expression on the face and the speech. The expression deriving section described above with reference to FIGS. 15 to 17 can output these expression dependent weights directly.

This allows expressiveness dependent HMM parameters to be represented as the linear interpolation of cluster models and the interpolation weights for each cluster HMM model are used to represent the expressiveness information.

Therefore, the training data can be classified into groups and the group dependent CAT weights can be estimated using all the training sentences in this group. If N training sentences are classified into M groups (M<<N), the training data can be expressed as M points in the CAT weight space.

In an embodiment, the NN used as transformation to map the linguistic features into the synthesis features and the CAT model which is used to construct the expressive synthesis feature space, can be trained jointly. The joint training process can be described as follows 1. Initial CAT model training to generate initial canonical model M0 and the initial CAT weight set $\Lambda_0$ which is composed of the CAT weights for all the training sentences, set iteration number i=0
2. Given the expressive linguistic features of training sentences and the CAT weight set of training sentences $\Lambda_i$, the NN for iteration i, i.e. $NN_i$ is trained using least square error criterion.
3. Using the expressive linguistic features of training sentences as input, $NN_i$ generate output CAT weight set of training sentences $O_i$
4. $\Lambda_{i+1}=O_i$. Given $\Lambda_{i+1}$ re-train the CAT canonical model $M_{i+1}$, to maximize the likelihood of training data
5. i=i+1 if algorithm converged, go to 6, else go to 2
6. end Through the process mentioned above, the NN and the CAT model are updated jointly which can improve performance at the synthesis stage.

This joint training process is not limited to NN and CAT models. In general a transformation from linguistic feature space to synthesis feature space other than NN and the methods to construct the synthesis feature space other than CAT can be updated using joint training in the same framework.

The above has described the training for the system. The text to speech synthesis will now be described with reference to FIG. 18.

Figure 18:
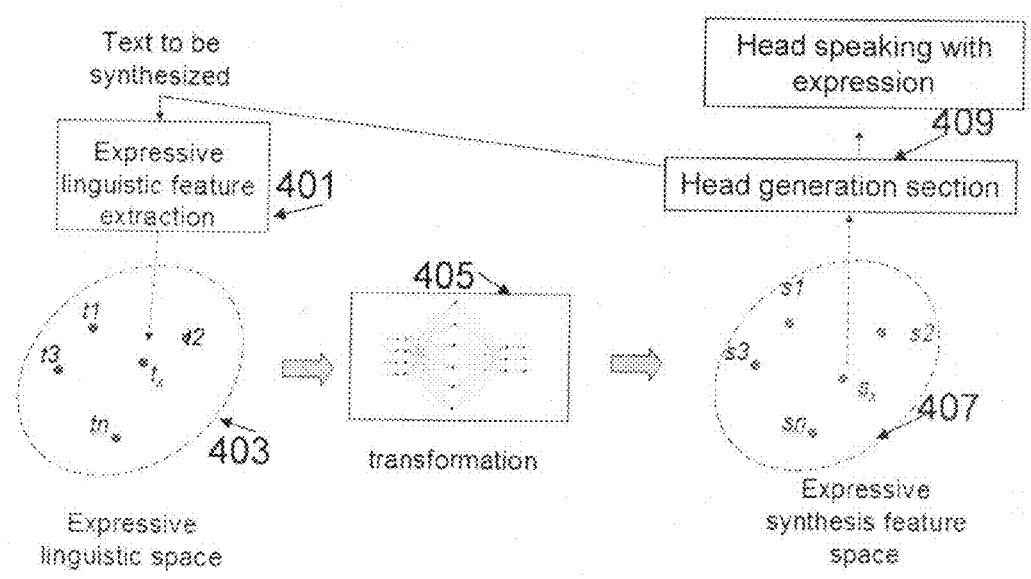
FIG. 18 is a schematic of an expression deriving section in a system in accordance with an embodiment.

The synthesis system shown in FIG. 18 comprises an expressive linguistic feature extraction block 401 which extracts an expressive feature vector from the response generated by the dialogue section in an expressive linguistic space 403 as described with reference to the training. The process for extracting this vector in the synthesis stage is identical to the process described in the training stage.

The expressive feature vector is then mapped via transformation block 405 to an expressive synthesis vector in an expressive synthesis space 407. The transformation block 405 has been trained as described above.

The determined expressive synthesis vector is then used directly as an input to the head generating section 409. As described above, in one embodiment the transformation block 405 maps the expressive linguistic feature vector directly to CAT weights in the expressive synthesis feature space 407.

In a method in accordance with an embodiment, there is no need to prepare special training data or require human interaction to assess training data. Further, the text to be synthesized is converted into the linguistic feature vector directly. This linguistic feature vector contains much more emotion information than a single emotion ID. The transformation block converts a linguistic feature vector into an expressive synthesis feature with same emotion. Further, this synthesis feature can be used to synthesize the speech with same emotion as in original text data.

If in expressive synthesis feature space, each training sentence is related to a unique synthesis feature vector, the unique emotion information in each sentence is learned by the transformation, e.g. NN. It can provide the user with very rich emotion resources for synthesis.

The training sentences when in the synthesis feature space can be classified into groups and all the training sentences in one group share the emotion information. Through this way, the training of transformation is improved since the number of patterns which need to be learnt is reduced. Therefore the transformation being estimated can be more robust. Choosing a sentence based synthesis feature or group based synthesis feature, tuning the number of groups for training data, may achieve a balance between the expressiveness and robustness for synthesis performance more easily in methods in accordance with embodiments of the invention.

In the above method, hard decision emotion recognition can be avoided and this will reduce errors. The possible outputs of a NN are infinite. It means that the proposed method potentially can generate infinite different synthesis features which are related to different emotions for synthesis. Further, the above method can achieve the balance between expressiveness and robustness easily.

In the above synthesis process, the emotion information of the text data does not need to be known or explicitly recognized by a human or from other sources. The training is completely automatic. The above method aims at building an expressive synthesis system without the need for a human to tag training data with emotions. During the synthesis process, there is no need for any classification of the emotions attributed to the input text. The proposed method can potentially reduce the cost of the training of expressive synthesis system. Meanwhile generate more expressive speech in synthesis process.

In the above embodiment, a multi-dimensional continuous expressive speech synthesis space is defined such that every point in the space defines parameters for an expressive speech synthesis system. Also, a mapping process is trained which can map text features to a point in expressive space which then defines parameters for an expressive speech synthesis process.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made without departing from the spirit of the inventions. The accompanying claims and their equivalents are intended to cover such forms of modifications as would fall within the scope and spirit of the inventions.

The invention claimed is:

1. A system for creating a response to an inputted user query, said system comprising:
 a user interface configured to emulate a subject by displaying a talking head including a face of the subject, and output speech from a mouth of the face with a voice of the subject, the user interface further including a receiver to receive a query from a user, the emulated subject being configured to respond to the query received from the user;
 a personality file memory storing a plurality of documents in an unstructured form and storing model parameters, the model parameters describing probability distributions that relate an acoustic unit to an image vector and a speech vector, the image vector including a plurality of parameters that define the subject's face and the speech vector including a plurality of parameters that define the subject's voice; and
 processing circuitry configured to
  convert said query into a word vector;
  compare said word vector generated from said query with word vectors generated from the documents in said personality file memory and output identified documents;
  compare said word vector selected from said query and passages from said identified documents and to rank said selected passages, said ranking being based on a number of matches between said selected passage and said query;
  concatenate selected passages together using sentence connectors to produce the response, wherein said sentence connectors are chosen from a plurality of sentence connectors, said sentence connectors being chosen based on a language model,
  convert the response into a sequence of acoustic units using a statistical model, the statistical model including a plurality of model parameters, the model parameters being retrieved from the personality file memory,
  output a sequence of speech vectors and image vectors that are synchronized such that the head appears to talk,
  output an expressive response such that the face and voice demonstrate expression, and
  determine the expression with which to output the generated response,
 wherein the model parameters stored in the personality file memory describe probability distributions that relate the acoustic unit to the image vector and the speech vector for an associated expression.

2. The system according to claim 1, wherein the ranking is based on a normalized measure of the number of matches between said selected passage and said query.

3. The system according to claim 1, wherein the processing circuitry is configured to set a predetermined size for the response.

* * * * *